(12) United States Patent
    Gan et al.

(10) Patent No.: US 10,776,482 B2
(45) Date of Patent: Sep. 15, 2020

(54) AUTOMATED VIRTUAL MACHINE INTEGRITY CHECKS

(71) Applicant: International Business Machines Corporation, Armonk, NY (US)

(72) Inventors: Seng C. Gan, Ashburn, VA (US); Randy A. Rendahl, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 15/984,142

(22) Filed: May 18, 2018

(65) Prior Publication Data

US 2019/0354675 A1    Nov. 21, 2019

(51) Int. Cl.
    *G06F 21/51*      (2013.01)
    *G06F 9/455*      (2018.01)
    *G06F 11/34*      (2006.01)

(52) U.S. Cl.
    CPC .......... *G06F 21/51* (2013.01); *G06F 9/45558* (2013.01); *G06F 11/3409* (2013.01); *G06F 2009/45562* (2013.01); *G06F 2009/45587* (2013.01)

(58) Field of Classification Search
    None
    See application file for complete search history.

(56) References Cited

U.S. PATENT DOCUMENTS

| | | | |
|---|---|---|---|
| 7,908,653 B2 | 3/2011 | Brickell et al. | |
| 8,832,829 B2 | 9/2014 | Manni et al. | |
| 9,489,516 B1 | 11/2016 | Lu et al. | |
| 9,535,731 B2 | 1/2017 | Ashley et al. | |
| 9,697,019 B1* | 7/2017 | Fitzgerald | G06F 9/45537 |
| 10,185,827 B1* | 1/2019 | Hamlin | G06F 21/57 |
| 2009/0125902 A1 | 5/2009 | Ghosh et al. | |
| 2010/0174811 A1 | 7/2010 | Musiri et al. | |
| 2011/0185063 A1 | 7/2011 | Head et al. | |

(Continued)

OTHER PUBLICATIONS

Author Unknown, Automating Security with DevOps: It can work, Webpage: www.coveros.com, Printed from Website on May 18, 2018, pp. 1-9, Coveros, Published at: https://www.coveros.com/automating-security-with-devops-it-can-work/.

(Continued)

*Primary Examiner* — Wynuel S Aquino
(74) *Attorney, Agent, or Firm* — William H. Hartwell

(57) ABSTRACT

A baseline virtual machine (VM) instance is created within a protected secure environment from a production VM image. The baseline VM instance is a protected clone of a production VM instance created within a deployed environment from the production VM image. VM instance information of the baseline VM instance is collected during a startup process of the baseline VM instance within the protected secure environment. First baseline validity code is generated from the collected VM instance information of the baseline VM instance. VM instance information of the production VM instance is collected during a startup process of the production VM instance within the deployed environment. First production validity code is generated from the collected VM information of the production VM instance. A determination is made as to whether there is an error in the production VM instance by comparing the first baseline validity code and the first production validity code.

18 Claims, 10 Drawing Sheets

(56) References Cited

U.S. PATENT DOCUMENTS

| | | | |
|---|---|---|---|
| 2011/0265168 A1 | 10/2011 | Lucovsky et al. | |
| 2011/0321166 A1 | 12/2011 | Capalik et al. | |
| 2017/0052807 A1 | 2/2017 | Kristiansson et al. | |
| 2018/0210748 A1* | 7/2018 | Kakaraparthi | G06F 9/45558 |
| 2019/0138713 A1* | 5/2019 | Fusenig | G06F 21/53 |

OTHER PUBLICATIONS

Yves Deswarte, et al., Remote Integrity Checking, How to Trust Files Stores on Untrusted Servers, Integrity and Internal Control in Information Systems VI, Abstract, 2004, pp. 1-4, vol. 140, Springer, Boston, MA, Published at: http://link.springer.com/chapter/10.1007%2F1-4020-7901-X_1#p.-1.

Author Unknown, Remote scan for viruses and vulnerabilities of computers in network using My Control Center in Kaspersky Pure R2, Webpage: kaspersky.com, Printed from website on May 18, 2018, pp. 1-5, AO Kaspersky Lab, Published at: https://support.kaspersky.com/4835.

Rich Mogull, Security automation with DevOps: show me the code!, Webpage: devops.com, Printed from website on May 18, 2018, pp. 1-9, Mediaops, LLC, Published at: https://devops.com/security-automation-devops-show-code/.

Dana Petcu, et al., European Research Activities in Cloud Computing, 2012, p. 164, Cambridge Scholars Publishing, UK, Published at: https://books.google.com/books?id=uSwsBwAAQBAJ&pg=PA164&lpg=PA164&dq=cloud+mutual+integrity+check&source=bl&ots=mKYsc831ZS&sig=4OauMKFExCJm4PMEVUt3AskLV8&hl=en&sa=X&ved=0ahUKEwjms_2FzoXRAhVM4CYKHUw5DW0Q6AEIKTAA#v=onepage&q=cloud%20mutual%20integrity%20check&f=false.

Alyssa Robinson, Continuous Security: Implementing the Critical Controls in a DevOps Environment, Dec. 20, 2016, pp. 1-18, SANS Institute, Published at: https://web.archive.org/web/20180212105502/https://www.sans.org/reading-room/whitepapers/critical/continuous-security-implementing-critical-controls-devops-environment-36552.

Yan Zhu, et al., Collaborative Integrity Verification in Hybrid Clouds, In Proceedings of: 7th International Conference on Collaborative Computing: Networking, Applications and Worksharing (CollaborateCom), Oct. 15, 2011, pp. 1-10, IEEE, Also published at: https://people.cs.clemson.edu/~hongxih/papers/CollaborateCom2011-1.pdf.

* cited by examiner

AUTOMATED VIRTUAL MACHINE INTEGRITY CHECKS

BACKGROUND

The present invention relates to virtual machines. More particularly, the present invention relates to automated virtual machine integrity checks.

A virtual machine is an executable instance of a processing environment that may encapsulated within a virtual machine image and deployed for execution by one or more computing platforms. When instantiated and executed by a computing platform, a virtual machine may instantiate and run one or more processes and/or threads to perform work on the computing platform.

SUMMARY

A computer-implemented method includes creating, from a production virtual machine (VM) image within a protected secure environment, a baseline VM instance that is a protected clone of a production VM instance created from the production VM image within a deployed environment; during a startup process of the baseline VM instance within the protected secure environment, collecting VM instance information of the baseline VM instance; generating a first baseline validity code from the collected VM instance information of the baseline VM instance; during a startup process of the production VM instance within the deployed environment, collecting VM instance information of the production VM instance; generating a first production validity code from the collected VM information of the production VM instance; and determining whether there is an error in the production VM instance by comparing the first baseline validity code and the first production validity code.

A system that performs the computer-implemented method and a computer program product that causes a computer to perform the computer-implemented method are also described.

DETAILED DESCRIPTION

Figure 1:
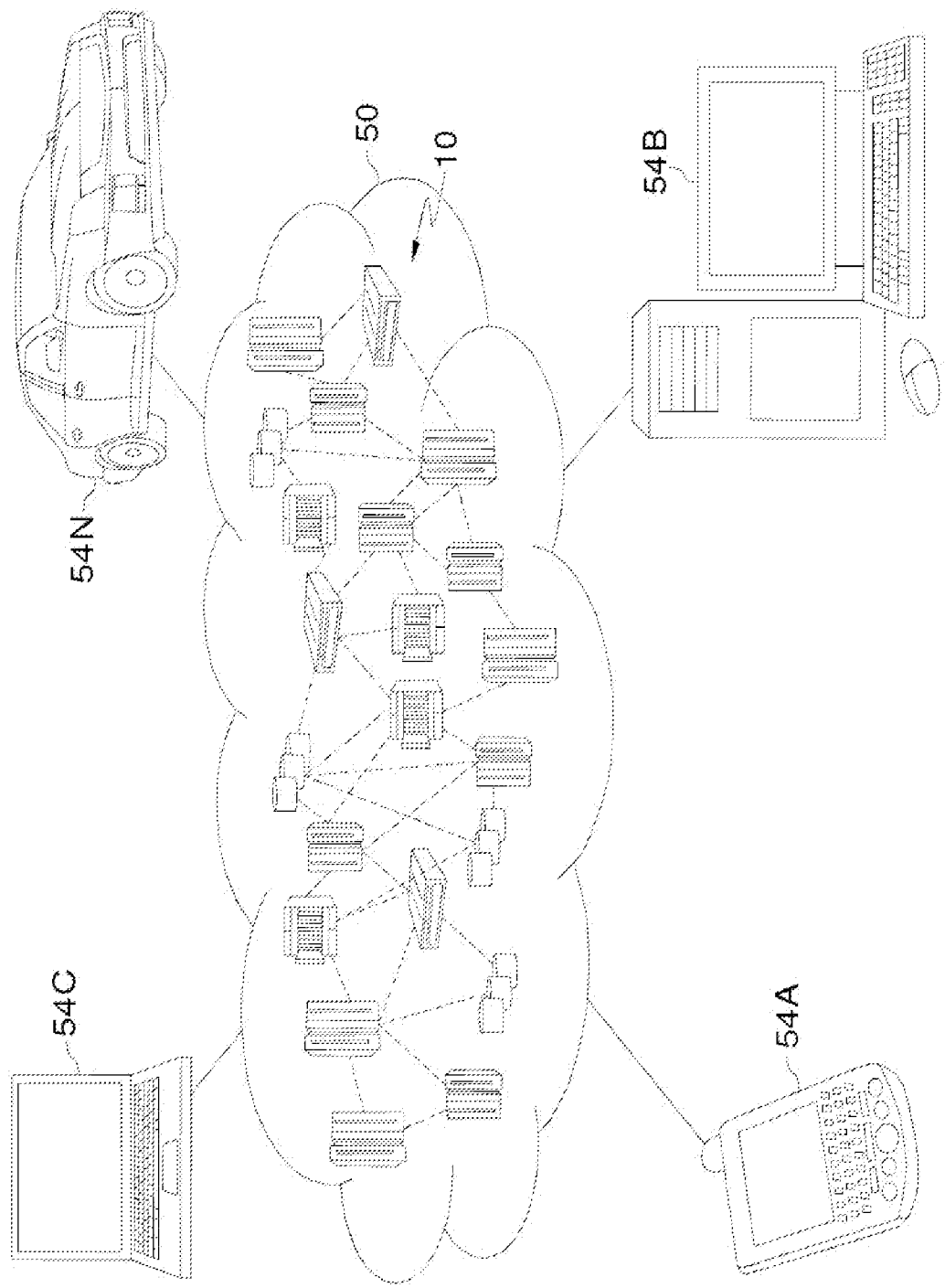
FIG. 1 depicts a cloud computing environment according to an embodiment of the present invention.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides automated virtual machine integrity checks. The present technology solves several recognized technological problems with deployed virtual machines that were determined to cause operational integrity and security issues for systems that utilize and rely upon deployed virtual machines. For example, it was determined that if a deployed virtual machine becomes corrupted due to hacking or other issues (e.g., a computer virus, in-memory image modification, etc.), there is no conventional approach by which to detect the corrupted virtual machine in real time to prevent a corrupted virtual machine from performing unauthorized or incorrect data manipulations on the system. It was further observed that conventional approaches to virtual machine validation utilize and rely upon repository information (e.g., virtual machine "image" information, digital signatures, etc.). However, it was determined that this type of repository information may itself be out of date or corrupted, and as a result use of this type of repository information to validate a virtual machine instance may still allow a corrupted virtual machine instance to go undetected, and may still allow the corrupted virtual machine instance to perform unauthorized or incorrect data manipulations. The technology described herein provides a new form of computing platform and computing processing that facilitates both individual and mutual real-time virtual machine integrity checks on deployed virtual machines within complex and distributed computing environments.

For each of the individual and mutual real-time virtual machine integrity checks, the technology described herein implements a new form of a distributed control system that allows runtime verification of target/deployed virtual machines to be performed by use of a duplicate protected and un-altered/control instance of the actual deployed virtual machine instance. The technology described herein provides a real-time virtual machine instance verification model that is not linked to potentially out-of-date repository information about the target system (e.g., out-of-date signatures, or other out-of-date information). The new distributed control system may be used across systems and components in a cooperative manner to perform mutual real-time virtual machine verification across a horizontal set of deployed virtual machine instances or to perform individual real-time virtual machine verification of a single deployed virtual machine instance. As such, the technology described herein protects entire virtual machine instances, which includes the respective operating system and all associate applications, instead of relying upon virtual machine "image" information in a repository. The technology described herein operates to detect post-deployment corruption of deployed virtual machine instances by inspecting and forming multiple integrity values over time of one or more file and/or memory areas within a virtual machine instance that are not configured or supposed to change within the virtual machine instance.

Regarding the formed integrity values, a set or library of validity code functions may be maintained that may be used to perform real-time calculations representative of operational integrity of a running virtual machine. An initial integrity value may be calculated using a selected validity code function for use as a virtual machine instance identifier (VM-ID). Because this VM-ID is derived directly from the virtual machine instance, the VM-ID is different from a conventional virtual machine identifier derived as a static value from a virtual machine image. The calculated VM-ID provides an initial runtime validity check usable for registration of the specific virtual machine instance that also operates as an initial step toward preventing registration of corrupted virtual machine instances. Runtime validity of the virtual machine instance may be performed over time by calculation of multiple subsequent integrity values using one or more additional/alternative selected validity code functions. Details of the integrity value calculation using validity code functions and the associated virtual machine instance verification processing are described further below.

The new control system operates by adding three (3) new components within a distributed and collaborative computing arrangement. The first new/added component is an operative (secure) health check controller component (hereinafter alternatively "health check controller" for brevity). The health check controller manages and supervises system security related to real-time integrity checks of deployed operating virtual machines. The health check controller is an operational component that participates in both individual and mutual real-time virtual machine integrity checks by interrogating virtual machine instances regarding operational attributes that may be used to verify/validate the operational integrity of the respective virtual machines, as described in more detail below. The operational attributes are derived as introduced above directly from virtual machine instances using a set of validity code functions.

The second new/added component is an operative health check agent component (hereinafter alternatively "health check agent" for brevity) that is integrated into each production virtual machine. The health check agent is an operational component of the virtual machine that participates in both individual and mutual real-time virtual machine integrity checks by responding to real-time validation queries from the health check controller. The health check agent responds to these validity queries from the health check controller by performing the requested analysis on the underlying virtual machine instance, and returns validity responses that may be used by the health check controller to verify/validate the operational integrity of the respective virtual machine within which the health check agent is deployed as an operational component.

To assist with real-time operational verification of deployed (remote) virtual machines, the health check controller maintains a third/new element within a secure environment, termed herein as a secure "local clone" instance or "protected clone" that is an operational duplicate of the respective deployed/production virtual machine instance for which operational integrity is to be verified. This local clone is instantiated from the same production virtual machine image used to instantiate the deployed/production virtual machine instance(s), and as a result clones the deployed/production virtual machine instance(s) within the protected environment. The local clone includes the same health check agent and the same operational code as the deployed/production virtual machine, and secure integrity check results may be generated and used to verify the deployed/production virtual machine. It should further be noted that, even where virtual machines are heterogeneous as described in more detail below (e.g., the virtual machines differ in one or more configuration aspects), a protected virtual machine may be considered a protected clone as long as the core operational regions that are to be scanned for validity codes yield the same results for an uncorrupted virtual machine instance within each of the protected clone and the heterogeneous deployed virtual machine. As such, a clone does not have to be identical or an exact duplicate to be utilized to validate a deployed virtual machine instance, as long as the same virtual machine image is used to instantiate each operational virtual machine.

These three (3) new technological operational components/elements collaborate and programmatically operate in combination to perform real-time validation of deployed virtual machine instances. These components/elements communicate across distributed computing platforms to verify/validate the integrity of deployed virtual machine instances.

To facilitate security of the local clone, the local clone may be instantiated within a controlled/secure/protected environment, termed herein for brevity as a "sandbox" (e.g., an isolated/protected secured network). The local clone may be maintained within the secure sandbox in a protected state that prevents any modification or corruption of the local clone instance. As a result, this local clone may act as a fully-operational control component because it is identical in build and operational functionality to the deployed virtual machine(s), it is constructed from the same virtual machine image, and it is known to be uncorrupted. This fully-operational local clone may then be used in real time as described herein to ensure the integrity of the deployed virtual machine by use of a variety of technological interactions originated by the health check controller to verify identical operational integrity of each of the deployed and the local clone virtual machines. The local clone may be queried by the health check controller in parallel with queries issued to the deployed virtual machine instance. The health check controller may then interpret operational responses received from the health check agent associated with the local clone relative to operational responses received from the health check agent associated with the deployed virtual machine to verify integrity of the responses received from deployed virtual machine.

With the description above as a foundation, it should be noted that use of the term "individual" to describe the individual real-time virtual machine integrity checks is not to be considered to limit validation to be performed on just one virtual machine. In contrast, the term "individual" is used herein to describe the particular form of interaction between the health check controller and a health check agent located within a particular virtual machine. As such, the individual real-time virtual machine integrity checks may be used to independently provide dynamic validation of one or more individual deployed virtual machines using a single health check controller, or multiple health check controllers may be utilized as appropriate for a given implementation. Additionally, the respective deployed virtual machines may be identical virtual machines, or may be different types of virtual machines provided the virtual machines have common areas that may be evaluated to validate the respective virtual machines, as appropriate for a given implementation. It should also be noted that the "mutual" real-time virtual machine integrity checks may be used to provide dynamic validation of virtual machines across a set of horizontally deployed/like systems to detect compromised virtual machines in a scalable manner. Other combinations of virtual machine validation are possible based upon combinations of the details of the respective individual and mutual real-time virtual machine integrity checks described herein, and all such combinations are considered within the scope of the subject matter described herein.

Several technological differentiators and technological advancements are provided by the technology described herein. First, the dynamic nature of the technological validation that is performed across distributed locations is designed to create variability in the challenge/response that limits the ability of a packet scanner to learn and predict the correct response that would otherwise allow a hacker to mask issues in the operational virtual machine instance(s). As described herein, the integrity challenge question is randomly selected and specifies randomly selected files and/or memory locations to be scanned and for which an integrity value is to be computed and returned as an answer to the challenge question. As a result, both the challenge question and the answer do not repeat and are thereby not predictable. The randomly selected files may be selected from configuration files that do not change under normal operating circumstances, such as the operating system and other static memory and/or storage locations, and may also include entire files as appropriate for a given implementation. Memory locations that are static may also be utilized. The concept of random selection of challenge questions is considered to represent at least two dimensions of processing. As described in more detail below, the first dimension represents a selection of a particular challenge function, and the second dimension represents a random specification of different file and/or memory locations to be processed by a randomly-selected validity code function. Additional details of techniques for random selection of challenge questions and random specification of files/memory locations to be scanned and processed are described in more detail below.

A second technological differentiator and technological advancement is achieved because the distributed nature of the operations described herein removes a single point of access that may be vulnerable to compromise. With a conventional centralized database signature, a system may be compromised under the circumstances of someone hacking into the centralized database. In contrast, by use of the technology described here, each pair of the virtual machines would need to be infected/broken into literally at the same time and in the same identical manner to avoid detection. If a particular deployment involves a chain of virtual machines, the entire chain would have to be infected simultaneously and identically in order to avoid detection because as long as one component of the chain is not infected, the technology described herein may detect and either quarantine or shut down all system accesses and communication(s). Quarantine of a compromised/corrupted virtual machine may improve the real-time detection capabilities of the computing technology by allowing analysis of the actual corrupted virtual machine instance without jeopardizing further corruption to the system within which the virtual machine instance was operating and detected/determined to be corrupted.

A third technological differentiator and technological advancement is achieved by the control system described herein being adaptive to any newly-developed application. The adaptive processing is achieved by use of validity codes that are randomly generated from randomly selected files and/or memory locations, and by use of a local clone that is synchronized as part of the remote deployment to allow dynamic changes of content used for verification processing. The technology described herein has no dependence on a local or remote database that would conventionally need to be maintained in synchronization with the deployed systems to provide the source of verification information.

To further detail aspects of each of the automated virtual machine integrity checks described herein, the following sections provide details applicable to both the individual and mutual real-time virtual machine integrity checks, followed by additional details of the mutual real-time virtual machine integrity checks further below. The health check controller interacts with the respective health check agents in real time and over time to challenge (e.g., interrogate) the health check agents regarding operational details that may be used to verify the operational integrity of the respective virtual machines in association with which the health check agents operate. The challenges/interrogations of the health check agents are designed to detect memory, file, or operational changes to deployed virtual machine instances using a variety of different techniques. The health check controller may randomly change the challenge techniques applied to the health check agents. As a result of the random changes to the applied operational integrity check techniques, hackers may not be able to predict how a virtual machine may be challenged/interrogated in real time and over time, and as a further result hackers may not be able to avoid prompt detection of an intrusion. Specifically, because any memory, file, or operational change to deployed virtual machines may be rapidly detected, any corrupted virtual machines may be promptly isolated and removed from system operations. As a result of the technological contributions as described herein, the computing technologies of each of virtual machine deployment, virtual machine operational integrity, and distributed system security may be improved.

To establish/derive baseline information useable for verification of deployed virtual machines, the health check controller may interact with the local clone virtual machine instance. The health check agent in the local clone virtual machine operating in the secured sandbox network generates a unique virtual machine identifier (VM-ID) from the running virtual machine during virtual machine startup processing. To generate the VM-ID, the health check agent scans certain (specified) areas of the virtual machine, which may include scans of processes, files, virtual machine image size, creation date, and other aspects of the virtual machine instance. The health check agent creates the unique VM-ID by applying a validity code function to the virtual machine scan results (e.g., scanned processes, files, virtual machine image size, creation date, etc.) This runtime-generated VM-ID uniquely identifies a running virtual machine instance as instantiated from the specific virtual machine image, and as such provides a first validity check of the virtual machine instance at the time of instantiation. The local clone virtual machine then reports detailed virtual machine operational attributes to the health check controller. The reported operational attributes may include the runtime-generated VM-ID, a number of running processes, process sizes of each running process, and other operational attributes as appropriate for a given implementation. The health check controller records these initial virtual machine operational attributes as registration information for the local clone virtual machine. The health check controller may then utilize this registration information as a baseline for future real-time queries of any other deployed virtual machines with similar reported VM-IDs because this initial registration information originates from the secured sandbox network, and is thereby known to be good/valid information for a virtual machine instantiated from the same virtual machine image.

When a deployed virtual machine attempts to register with the health check controller, the health check controller compares registration information received from the health check agent operating in the deployed virtual machine with the baseline registration information received from the local clone with the same VM-ID to verify the registration of the deployed virtual machine. If the baseline registration information received from the health check agent operating in the deployed virtual machine matches the baseline registration of the respective local clone, the deployed virtual machine may be considered uncorrupted and registration for system operation of the deployed virtual machine may be completed. Alternatively, if the baseline registration information received from the health check agent operating in the deployed virtual machine does not match the baseline registration of the respective local clone, the deployed virtual machine may be considered corrupted and registration for system operation of the deployed virtual machine may be denied. As such, virtual machines instantiated from corrupted virtual machine images may be prevented from having operational in-system access/authority and may be prevented from performing system-level operations. As a result of these technological contributions as introduced above, the computing technologies of each of virtual machine deployment, virtual machine operational integrity, and distributed system security may be improved.

After a successful registration of a deployed virtual machine, the health check controller routinely and/or randomly sends health check commands to the health check agents operating in each of the deployed virtual machine and the local clone. The health check commands may include commands that instruct each virtual machine health check agent to perform random memory and/or file scans, generate validity code(s) of specified sections of memory, and other operational integrity checks as appropriate for a given implementation. The scans may include targeted files/memory areas deemed critical. Alternatively, the scans may target expected protection services, such as anti-virus software to assure the self-monitoring system is a healthy (non-corrupted) system.

Further, for the random selection of files and memory, the health check agent may perform a complete scan of all content identified in a query; however, the validity code may be derived only from processes, files, operating system related files, and other aspects of the virtual machine that are known to be non-transient in nature. Other transient files (e.g., log files, temp files, etc.) may be left out of the validity code, while still being scanned to ensure the transient files do not include hidden threats to system security. Use of wild-carding on the random file selection may be designed to catch extra files that should not be present and that may represent a threat. Additional areas that may be identified include unexpected tasks running, unexpected ports being opened, and other operations by a deployed virtual machine that may also be processed though a pattern matching filter or validity code result.

For example, as introduced above, the concept of random selection of challenge questions is considered to represent at least two dimensions of processing. Regarding the first dimension of the challenge questions, the technology described herein may maintain a library of validity code functions (e.g., one hundred or more functions). Each validity code function may perform different computations using the data that is scanned. The library of validity code functions may be indexed and may be stored in association with each of the health check controller and the respective health check agent(s). Example validity code functions may include combinations of addition (e.g., a checksum), subtraction, multiplication, and division of scanned data elements, and may include many other variations on calculation of validity code values. Regarding implementation of an addition validity code function, scanned data elements may be added, and the resulting summation value may be truncated to an implementation-selected field width (e.g., thirty-two (32) bits, sixty-four (64) bits, etc.) to arrive at a validity code for the selected scanned data elements. Similar processing may be performed for subtraction, multiplication, and division of scanned data elements. A cyclic redundancy check (CRC) or other type of function may also be utilized. Further, combinations of these or other types of validity code functions may be utilized, as appropriate for a given implementation.

Regarding the second dimension of the challenge questions, the technology herein also performs a random specification of different file and/or memory locations to be processed by a randomly-selected validity code function in association with each challenge question. For example, random selection of file and/or memory locations may result in selection of continuous ranges of file and/or memory locations, selection of every other file and/or memory location, selection of every third file and/or memory location, or other variations may be utilized as appropriate for a given implementation.

To implement the two-dimensional challenge question, the health check controller may randomly select each of: (i) a random index into the library of validity code functions; and (ii) a random selection of one or more file locations and/or memory ranges to be scanned and to which the randomly selected validity code function is to be applied. The health check controller may communicate the two-dimensional challenge question in a validation query that is sent to the respective health check agents. The protected/sandbox health check agent and the deployed health check agent may each process the two-dimensional challenge question, and perform the respective/random validity code calculation on the respective/random file and/or memory locations. Results of each independent processing on the respective virtual machines may be utilized to validate the deployed virtual machine.

It should be noted that because the library of validity code functions forms a part of the respective virtual machine images along with the health check agent, if the library itself or the health check agent within a deployed virtual machine image becomes corrupted, selection and processing of the correct validity code function will be unlikely if not impossible irrespective of whether the appropriate locations are scanned. As a result, even if the remainder of the virtual machine is not corrupted, the deployed virtual machine will eventually not pass validation. Further, if the underlying virtual machine is corrupted while the library and health check agent remain uncorrupted, the deployed virtual machine will eventually fail to pass validation due to the ongoing and random set of inquiries presented within the ongoing set of two-dimensional challenge questions that over time encompass the entire virtual machine image.

Responses to the health check commands that include the calculated validation codes received from the respective health check agents operating in the deployed virtual machine and in the secure local clone may then be compared to verify that the deployed virtual machine provides the same real-time response(s) as the secure local clone. If the received responses match, the deployed virtual machine may be considered verified because it provides the same/identical operational response as the local clone that is operating in the sandbox network. As such, the technology described herein goes far beyond mere data comparison because it performs an actual in-system operational functional comparison in an efficient and improved computing approach. What this technological processing accomplishes is verification that the operational memory and files of the deployed virtual machine have not become corrupted through hacking or other compromise. As a result of these technological contributions as described herein, the computing technologies of runtime virtual machine operational integrity and distributed system security during runtime operations may each be improved.

To further detail the mutual real-time virtual machine integrity checks, it should be noted that two or more deployment locations and two or more deployed virtual machines may be utilized in combination to perform the mutual real-time virtual machine integrity checks. The respective deployed virtual machines may each include a health check agent, as described above, and may operate collaboratively to verify integrity of one or more other deployed virtual machines. As such, the mutual real-time virtual machine integrity checks described herein may be used to provide dynamic validation of virtual machines across a set of horizontally deployed/like systems to detect compromised virtual machines in a scalable manner.

Regarding implementation of the mutual real-time virtual machine integrity checks, the health check controller may be implemented as a stand-alone operational component to monitor a set of deployed virtual machines, as described above with respect to the health check controller. Alternatively, the health check controller may be partitioned into a set of mutual health check controllers, with one instance of the partitioned mutual health check controller component integrated with the respective health check agent in each virtual machine. The health check agent(s) with the integrated health check controller capabilities may then interoperate with other instantiated mutual health check agents to perform the mutual real-time virtual machine integrity checks.

The facilitate the mutual real-time virtual machine integrity checks, two or more locations may each be configured with a local deployed virtual machine that performs operational work within the respective deployment platform, and may each be configured with a local clone of a remote virtual machine that the local deployed virtual machine communicates and interacts with to carry out its operational workload. By configuring each platform that interacts with another platform with a clone of the respective other remote virtual machine, the local mutual health check controller/agent at each platform may perform integrity checks to improve security and integrity of remote virtual machine operations.

As examples of the mutual integrity check processing, the mutual integrity check processing may be performed using either homogenous or heterogeneous virtual machine images. Homogenous virtual machine images may be considered identical virtual machines that are instantiated from identical virtual machine images, with identical configurations (e.g., identical numbers of processes, identical process sizes, identical configured memory sizes, etc.). In contrast, heterogeneous virtual machine images may be considered virtual machines that differ in one or more configuration aspects (e.g., different numbers of processes, different process sizes, different configured memory sizes, etc.) that are instantiated from the same virtual machine image with different configuration parameters. For heterogeneous virtual machine validation as described herein, these differences may result in different memory and/or file locations in the respective instances, and these differences may be accounted for by adjusting the respective scanned locations in the different virtual machines such that the same relative memory areas and file locations are scanned to ensure identical scans and validity code results.

Some terminology used in describing some embodiments of the present invention will now be explained. A "validity code function" is hereby defined as a programmatic mathematical process/function applied to a specified random range of one or more sets of underlying data by which a unique identifying value, termed herein a "validity code" or "integrity value," is derived that distinctly and uniquely identifies content(s) of one or more areas of data (e.g., memory, files, etc.). The specification of a randomly-selected validity code function in combination with a randomly-specified file and/or memory range is alternatively termed an "integrity check" and/or a "two-dimensional challenge question" herein. As described in more detail above, the validity code function that is applied may be a checksum function or other mathematical function, a cyclic redundancy check (CRC) function or other computational function, or a combination of these types of functions, as appropriate for a given implementation. The validity code/integrity value may be any length, such as thirty-two (32) bit, sixty-four (64) bit, or longer values, also as appropriate for a given implementation. Additionally, as described above, many sets of these applied validity code functions may be utilized and selected randomly over time, such as by use of a library of validity code functions. Validity codes may be used by computers as described herein to verify that content(s) of certain specific memory and/or file locations of deployed virtual machine instances are unchanged over time and/or to verify that the content of the specific memory and/or file locations within the different virtual machine instances are identical to each other. As such, a validity code represents a compact unique validation identifier that may be independently calculated by different health check agents/controllers, transmitted in a compact/efficient manner, and compared rapidly in real-time to detect operational differences in different virtual machines.

The technology described herein operates by a baseline virtual machine (VM) instance being created within a protected secure environment from a production VM image, where the baseline VM instance is a protected clone of a production VM instance created within a deployed environment from the production VM image. VM instance information of the baseline VM instance is collected during a startup process of the baseline VM instance within the protected secure environment and a first baseline validity code is generated from the collected VM instance information of the baseline VM instance. VM instance information of the production VM instance is collected during a startup process of the production VM instance within the deployed environment and a first production validity code is generated from the collected VM information of the production VM instance. A determination is made as to whether there is an error in the production VM instance by comparing the first baseline validity code and the first production validity code.

As described herein, and stated alternatively, the problem of ensuring that a deployed virtual machine (VM) instance is/remains uncorrupted is solved by a health check controller creating a protected VM instance of the deployed virtual machine image within a secure environment; creating a unique identifier from one or more static portions of the protected VM instance; instructing a health check agent associated with the deployed VM instance to create a unique identifier from the same one or more static portions of the deployed VM instance (or retrieving a unique identifier created from the one or same static portions of the deployed VM instance); and determining, during runtime, whether the deployed VM instance is corrupted based upon the unique identifier of the protected VM instance relative to the unique identifier of the deployed VM instance.

According to certain alternative implementations, and to implement mutual integrity check processing, the problem of ensuring a deployed virtual machine (VM) instance is/remains uncorrupted is solved by a health check controller instantiating a local deployed VM instance from a second deployed VM image that performs work as deployed within a local computing platform; receiving a request from a remote health check controller to formulate a unique identifier from one or more static portions of the local deployed VM instance; creating the unique identifier from the one or more static portions of the local deployed VM instance; and returning the created unique identifier of the one or more static portions of the local deployed VM instance to the remote health check controller.

To further this implementation, creating the unique identifier from the one or more static portions of the local deployed VM instance may include instructing a local deployed health check agent that is within the local deployed VM instance to create the unique identifier from the one or more static portions of the local deployed VM instance; and receiving the unique identifier created from the one or more static portions of the local deployed VM instance from the local deployed health check agent.

It should be noted that conception of the present subject matter resulted from recognition of certain limitations associated with operational integrity and security of systems that utilize and rely upon deployed virtual machine instances. For example, it was observed that adoption of cloud and platform as a service (PaaS) technologies, combined with new development methodologies that incorporate a development and operations (DevOps) approach has created a much more fluid and transient production environment for deployment of production code. It was further observed that within this model, there is a combination of loss of ownership/visibility into the infrastructure, as well as a "hands off" approach to the actual deployment of the production code. It was observed that, as a result, these new development methodologies have created computing problems that did not previously exist and that new computing solutions were needed to address these newly-originated computing problems. For example, it was determined that within these new development environments new virtual machine images may be created rapidly and deployed within distributed computing environments, but that there is no conventional technology by which to check virtual machine images during startup or continuously in real time during execution to protect the virtual machine from virus infection, hacking, or other virtual image corruptions. Further, it was determined that virtual machines may be located in multiple distributed physical locations within cloud and hybrid cloud environments, but that there is no conventional approach by which to continuously monitor virtual machine integrity to make certain that the virtual machine's operating system and processes are not infected or corrupted. It was determined that these new problems prevented verification/monitoring of operational integrity and security of systems that utilize and rely upon deployed virtual machines. The subject matter described herein improves operational integrity and security of systems that utilize and rely upon deployed virtual machines by providing automated validation to ensure that the production virtual machine instances are untainted, as described above and in more detail below. By provisioning the local clone control instance into a strongly protected/secure environment that is not exposed to or used as part of the production environment, a reliable and trusted audit mechanism may be created that is usable to ensure the operational integrity of deployed virtual machines at initial startup and continuously over time. As such, the technology described herein solves newly-originated computing problems that result from use of new computing platforms. Improved system security and system operational integrity may be obtained through use of the automated virtual machine integrity checks described herein.

The automated virtual machine integrity checks described herein may be performed in real time to allow prompt verification of proper and uncorrupted operation of deployed (remote) virtual machines. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Additional details of the algorithmic processing and computational efficiencies will be provided further below. The following portion of the present description provides examples of advanced computational platform(s) within which the present technology may be implemented, followed by further details of the automated virtual machine integrity checks described herein.

It should be noted that the present technology may be implemented within or as part of a cloud computing environment, or may be implemented as a customized environment-specific solution. As such, examples of implementations for both environments are included herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
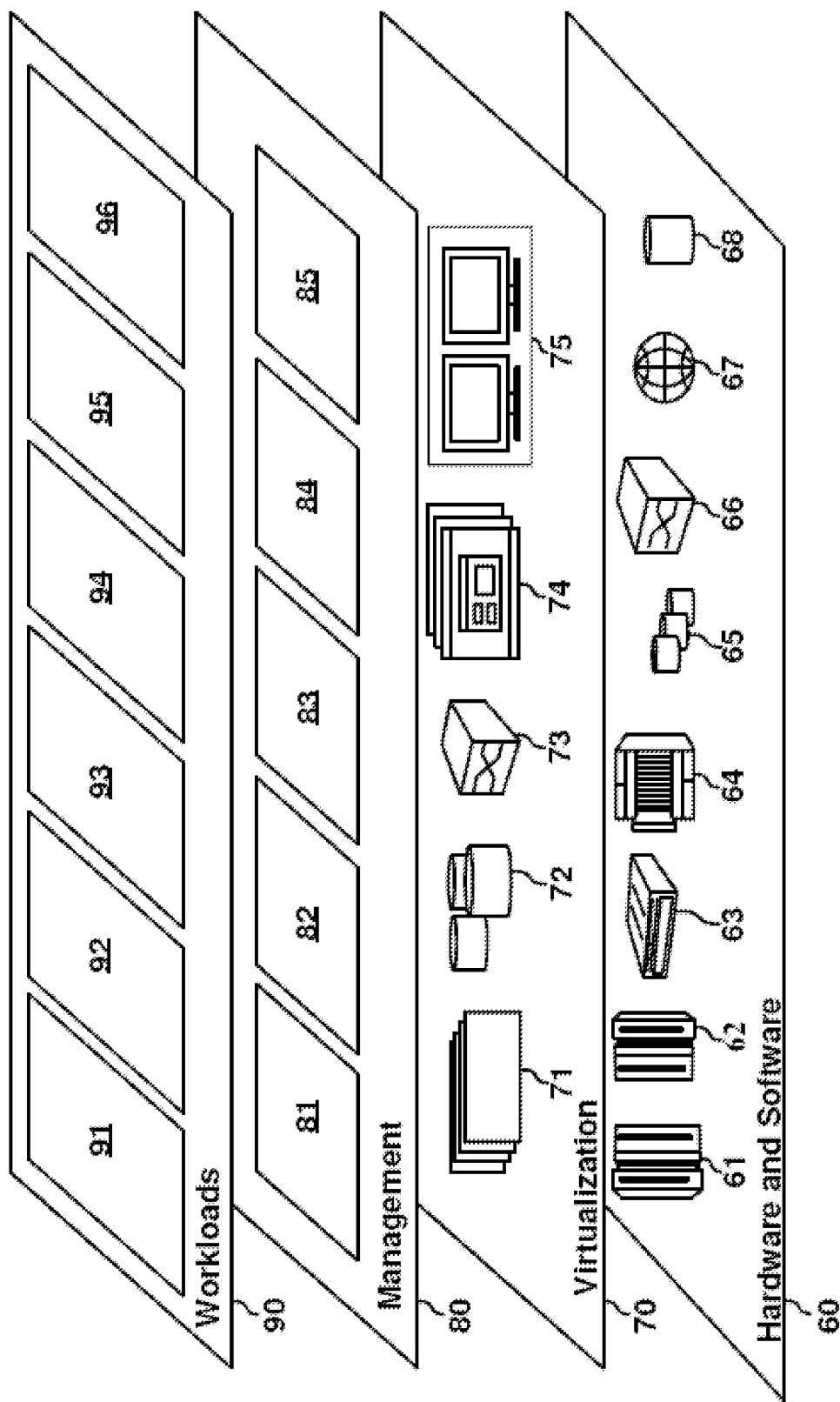
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automated virtual machine integrity checks 96.

Regarding alternative platform implementation options, FIGS. 3 and 4 below are directed to such alternatives. It should be understood that the various alternatives may be combined with or substituted with the implementation options described above and below, as appropriate for the given implementation.

Figure 3:
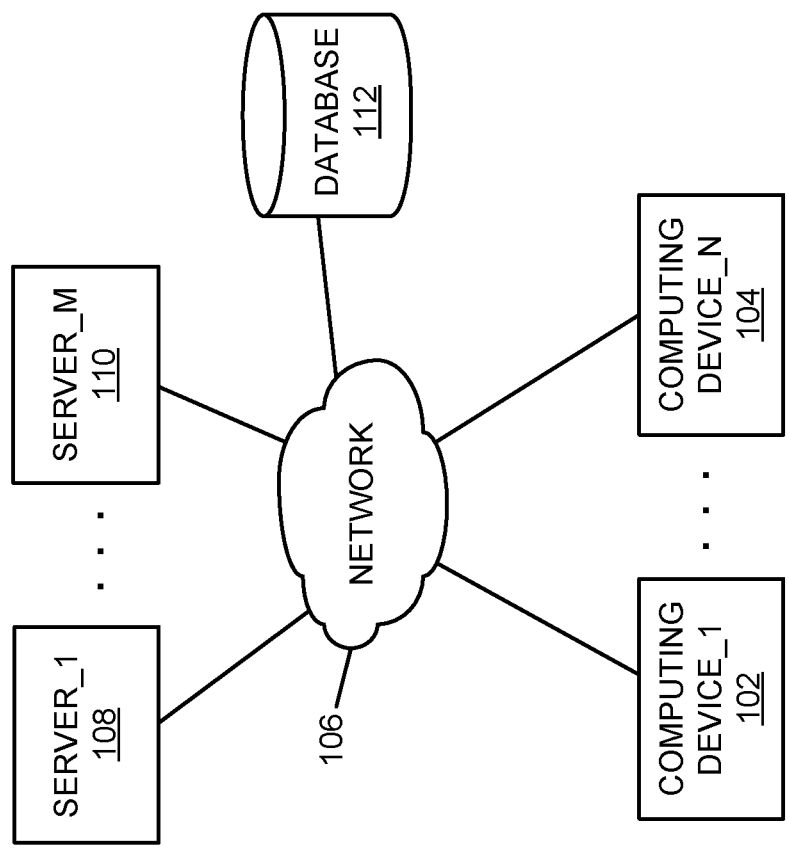
FIG. 3 is a block diagram of an example of an implementation of an alternative system for implementation of automated virtual machine integrity checks according to an embodiment of the present subject matter.

FIG. 3 is a block diagram of an example of an implementation of an alternative system 100 for implementation of automated virtual machine integrity checks. A computing device_1 102 through a computing device_N 104 communicate via a network 106 with several other devices. The other devices include a server_1 108 through a server_M 110. A database 112 provides storage within the system 100, such as for storage of virtual machine images and other information, as appropriate for a given implementation.

As will be described in more detail below in association with FIG. 4 through FIG. 10, each of the computing device_1 102 through the computing device_N 104 and the server_1 108 through the server_M 110 may provide automated virtual machine integrity checks. The automated virtual machine integrity checks are based upon detailed real-time verification of operational integrity of deployed virtual machines. The automated virtual machine integrity checks described herein improve system integrity and security of computing environments that utilize and rely upon deployed or remote virtual machines.

In view of the implementation alternatives described above, the present technology may be implemented within a cloud computing platform, at a user computing device, at a server device level, or by a combination of such platforms and devices as appropriate for a given implementation. A variety of possibilities exist for implementation of the present subject matter, and all such possibilities are considered within the scope of the present subject matter.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The server_1 108 through the server_M 110 may include any device capable of providing data for consumption by a device, such as the computing device_1 102 through the computing device_N 104, via a network, such as the network 106. As such, the server_1 108 through the server_M 110 may each include a web server, application server, or other data server device.

The database 112 may include a relational database, an object database, or any other storage type of device. As such, the database 112 may be implemented as appropriate for a given implementation.

Figure 4:
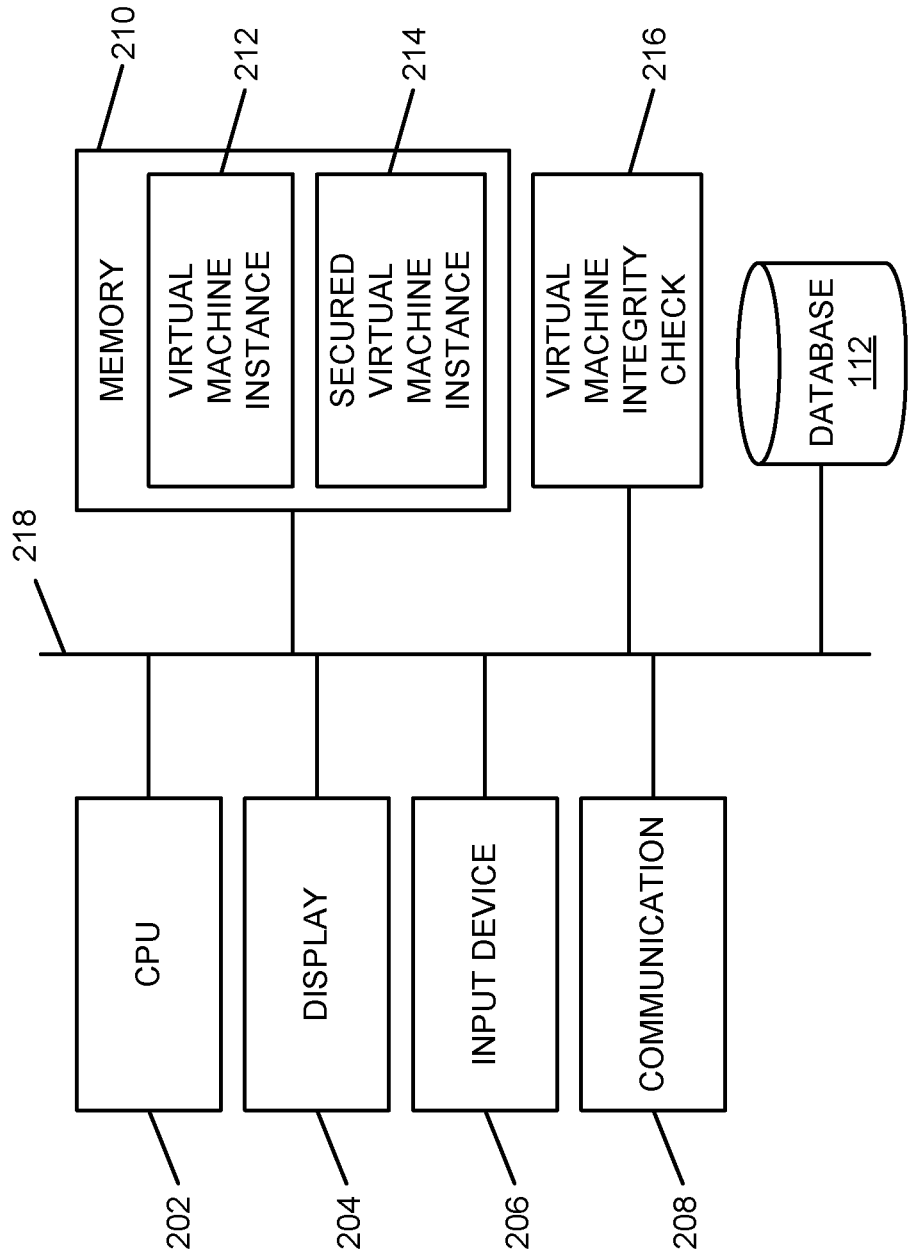
FIG. 4 is a block diagram of an example of an implementation of a core processing module capable of performing programmed processing associated with automated virtual machine integrity checks according to an embodiment of the present subject matter.

FIG. 4 is a block diagram of an example of an implementation of a core processing module 200 capable of performing programmed processing associated with automated virtual machine integrity checks. The core processing module 200 may be associated with either the computing device_1 102 through the computing device_N 104 and/or with the server_1 108 through the server_M 110, and/or with devices within the cloud computing environment 50, as appropriate for a given implementation. As such, the core processing module 200 is described generally herein, though it is understood that many variations on implementation of the components within the core processing module 200 are possible and all such variations are within the scope of the present subject matter. Further, the core processing module 200 may be implemented as an embedded processing device with circuitry designed specifically to perform the processing described herein as appropriate for a given implementation.

Further, the core processing module 200 may provide different and complementary processing of automated and/or mutual virtual machine integrity checks in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 ("processor") provides hardware that performs computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, voice command processing unit, or any other type of input device by which the user may interact with and respond to information on the display 204.

It should be noted that the display 204 and the input device 206 may be optional components for the core processing module 200 for certain implementations/devices, or may be located remotely from the respective devices and hosted by another computing device that is in communication with the respective devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides hardware, protocol stack processing, and interconnection capabilities that allow the core processing module 200 to communicate with other modules within the system 100, or within the cloud computing environment 50, as appropriate for a given implementation. The communication module 208 may include any electrical, protocol, and protocol conversion capabilities useable to provide interconnection capabilities, as appropriate for a given implementation. As such, the communication module 208 represents a communication device capable of carrying out communications with other devices.

A memory 210 includes a virtual machine instance area 212 that stores instances of deployed virtual machines that provide operational processing capabilities in association with core processing module 200. It is understood that for individual real-time virtual machine integrity checks, the virtual machine instances include health check agents. Further, as described above, for mutual real-time virtual machine integrity checks, the virtual machine instances include a collaborative/combined health check controller/agent. The memory 210 also includes a secured virtual machine instance area 214 that provides secured access for instantiation of and communications with clone virtual machine instances of deployed virtual machines. As such, the secured virtual machine instance area 214 provides an isolated/protected secured network termed a "sandbox" herein. It is understood that the two memory areas represented by the virtual machine instance area 212 and the secured virtual machine instance area 214, are illustrated together within FIG. 4 for ease of description and illustration purposes only; however, it is further understood that these two memory areas may be physically-separated and/or network-separated components when utilized within one or more systems to ensure isolated/protected secured network access to the clone virtual machine instance(s) by the health check controller described above and below, as appropriate for a given implementation.

It is also understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A virtual machine integrity check module 216 is also illustrated. The virtual machine integrity check module 216 provides programmatic automated processing capabilities for verification of the integrity of deployed virtual machines for the core processing module 200, as described above and in more detail below. The virtual machine integrity check module 216 implements the automated virtual machine integrity checks of the core processing module 200, and operates as the health check controller described herein.

It should also be noted that the virtual machine integrity check module 216 may form a portion of other circuitry described without departure from the scope of the present subject matter. The virtual machine integrity check module 216 may form a portion of an interrupt service routine (ISR), a portion of an operating system, or a portion of an application without departure from the scope of the present subject matter. The virtual machine integrity check module 216 may also include an embedded device with circuitry designed specifically to perform the processing described herein as appropriate for a given implementation.

The database 112 is again shown within FIG. 2 associated with the core processing module 200. As such, the database 112 may be operatively coupled to the core processing module 200 without use of network connectivity, as appropriate for a given implementation.

The CPU 202, the display 204, the input device 206, the communication module 208, the memory 210, the virtual machine integrity check module 216, and the database 112 are interconnected via an interconnection 218. The interconnection 218 may include a system bus, a network, or any other interconnection capable of providing the respective components with suitable interconnection for the respective purpose.

Though the different modules illustrated within FIG. 4 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. Many other possible arrangements for components of the core processing module 200 are possible and all are considered within the scope of the present subject matter. It should also be understood that, though the database 112 is illustrated as a separate component for purposes of example, the information stored within the database 112 may also/alternatively be stored within the memory 210 without departure from the scope of the present subject matter. Accordingly, the core processing module 200 may take many forms and may be associated with many platforms.

Figure 5:
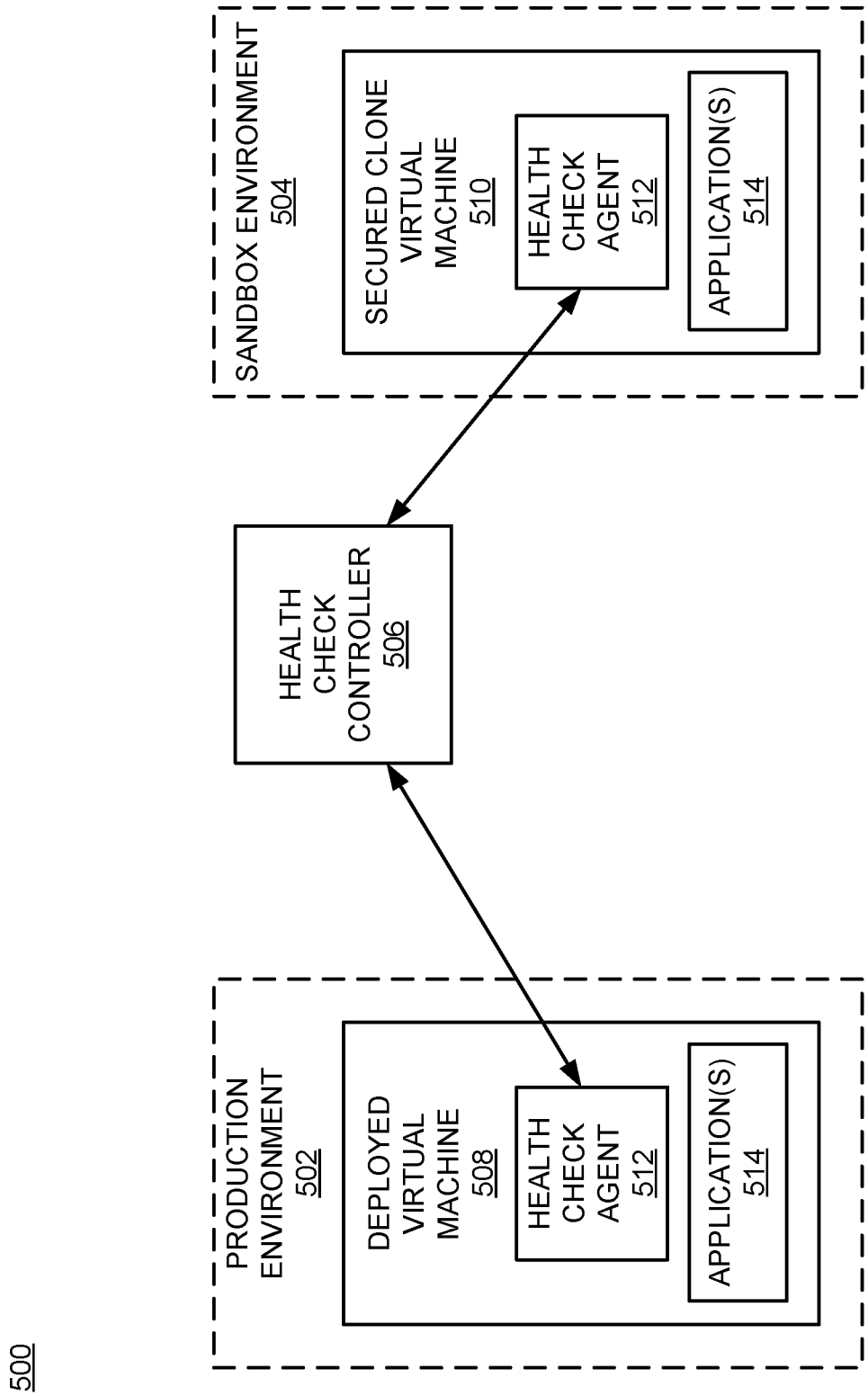
FIG. 5 is a logical block diagram that illustrates an example processing environment for implementation of the individual real-time virtual machine integrity checks according to an embodiment of the present subject matter.

FIG. 5 is a logical block diagram that illustrates an example processing environment 500 for implementation of the individual real-time virtual machine integrity checks described herein. As described above, the individual real-time virtual machine integrity checks may be used to provide dynamic validation of one or more individual deployed virtual machines.

Within the example processing environment 500, a production environment 502 is illustrated along with a secure sandbox environment 504. A health check controller 506 manages interactions within the processing environment 500 to validate one or more virtual machines deployed within the production environment 502.

Within the production environment 502, a deployed virtual machine 508 is illustrated for purposes of the present example, though as described in detail above, multiple virtual machines may be deployed within the production environment 502 and each of these virtual machines may be validated individually as described herein. Further, the deployed virtual machines are identical or different virtual machines, as appropriate for the given implementation.

The deployed virtual machine 508 includes a health check agent 512, as described above. The deployed virtual machine 508 also includes one or more application(s) 514 that perform the work of the deployed virtual machine 508.

Within the secure sandbox environment 504, a secured clone virtual machine 510 represents an identical duplicate instantiation of the deployed virtual machine 508. As such, the secured clone virtual machine 510 includes the same/identical health check agent 512 and the same/identical one or more application(s) 514.

Figure 8:
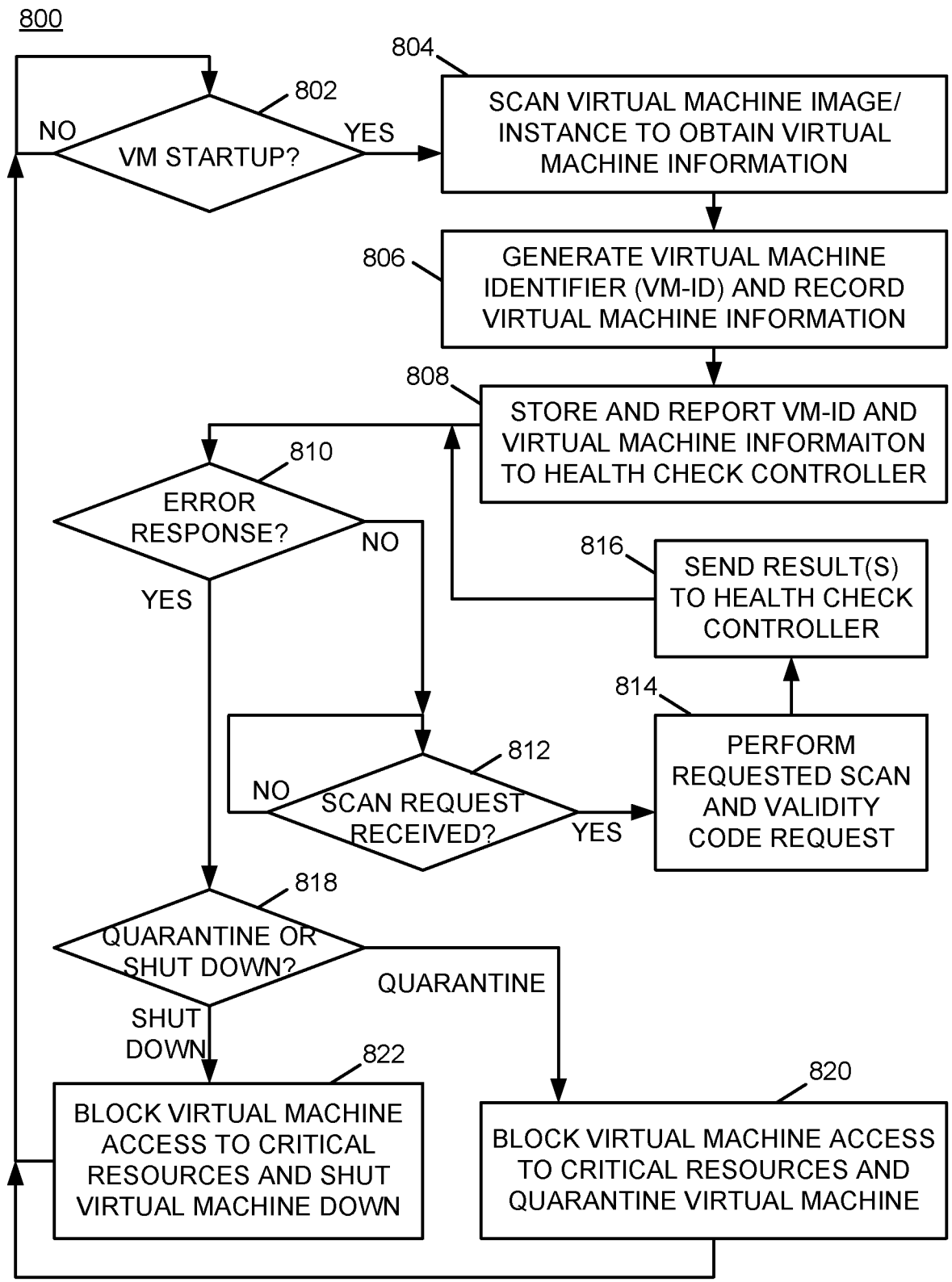
FIG. 8 is a flow chart of an example of an implementation of a process that illustrates additional detailed processing at a health check agent for either individual or mutual real-time virtual machine integrity checks according to an embodiment of the present subject matter.
Figure 9:
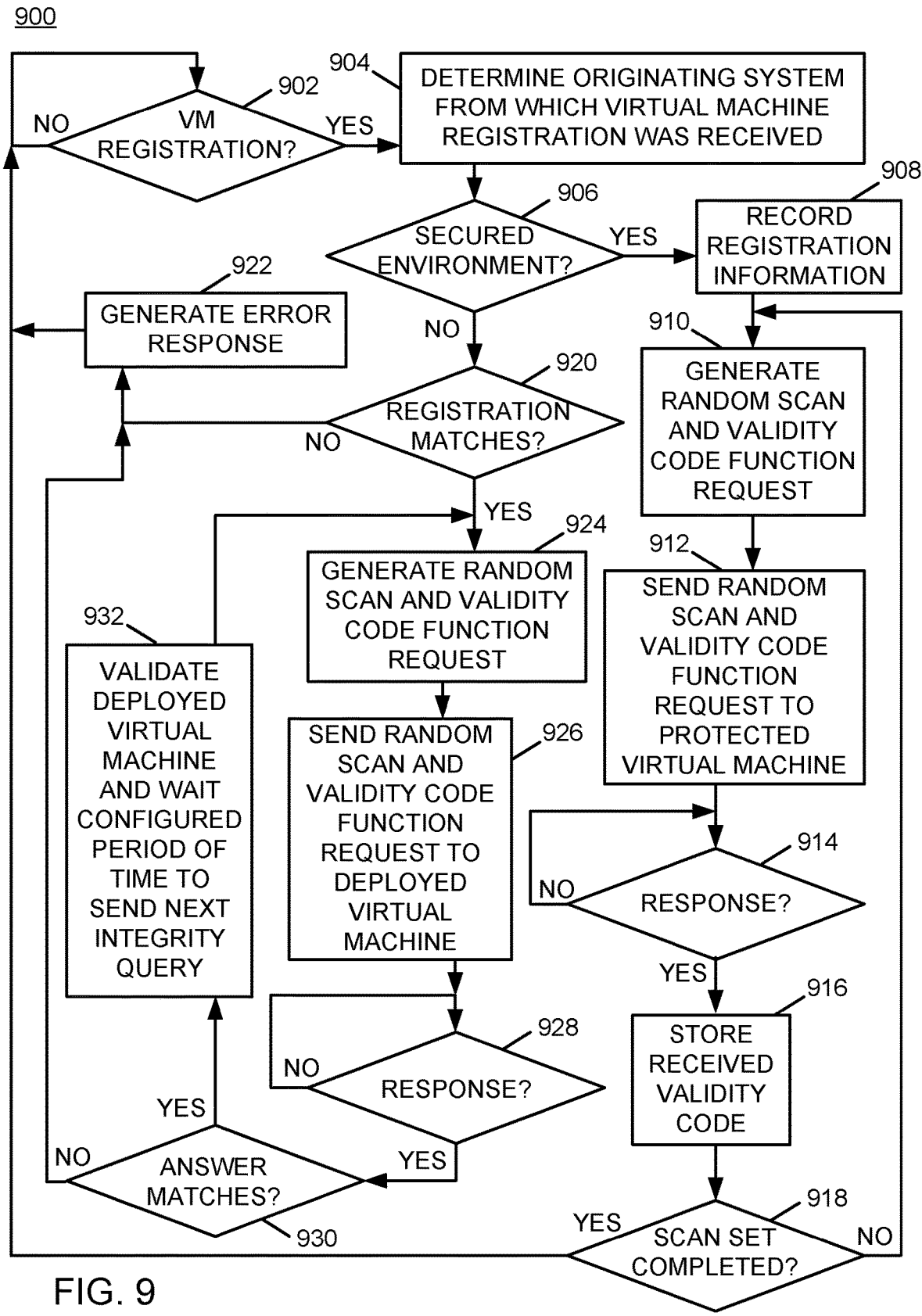
FIG. 9 is a flow chart of an example of an implementation of a process that illustrates additional detailed processing at a health check controller to perform individual real-time virtual machine integrity checks according to an embodiment of the present subject matter.

FIG. 8 and FIG. 9, described further below, illustrate flowcharts of detailed processing carried out within the example processing environment 500 between the health check controller 506 and the health check agents 512 for the individual real-time virtual machine integrity checks. Additional description is deferred at this time to further detail the logical block diagram processing environment for implementation of the mutual real-time virtual machine integrity checks.

Figure 6:
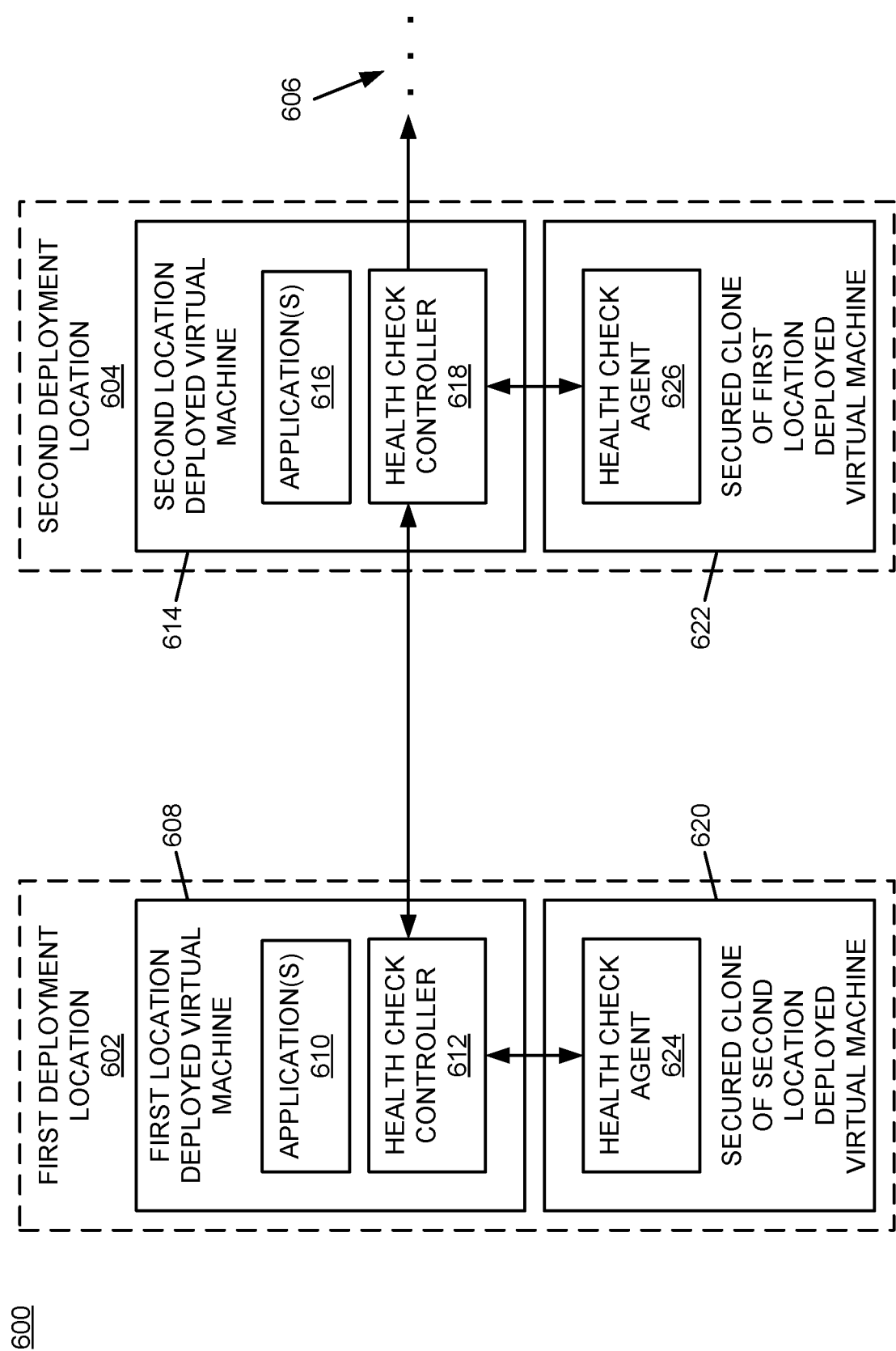
FIG. 6 is a logical block diagram that illustrates an example processing environment for implementation of the mutual real-time virtual machine integrity checks according to an embodiment of the present subject matter.

FIG. 6 is a logical block diagram that illustrates an example processing environment 600 for implementation of the mutual real-time virtual machine integrity checks described herein. As described above, the mutual real-time virtual machine integrity checks may be used to provide dynamic validation of virtual machines across a set of horizontally deployed/like systems to detect compromised virtual machines in a scalable manner.

Within the example processing environment 600, a first deployment location 602 is illustrated along with second deployment location 604. Ellipsis dots 606 illustrate that additional deployment locations may be involved in the mutual real-time virtual machine integrity checks, though additional illustrations of these additional deployment locations are omitted to reduce complexity of the drawing figure.

Within the first deployment location 602, a first location deployed virtual machine 608 performs work within the first deployment location 602. The first location deployed virtual machine 608 includes one or more application(s) 610 and a health check controller 612.

Within the second deployment location 604, a second location deployed virtual machine 614 performs work within the second deployment location 604. The second location deployed virtual machine 614 includes one or more application(s) 616 and a health check controller 618.

As described above, the health check controller 612 and the health check controller 618 manage interactions within the processing environment 600 to perform mutual validation of the other respective deployed virtual machines. Specifically, the health check controller 612 within the first location deployed virtual machine 608 validates the second location deployed virtual machine 614 within the second deployment location 604, while the health check controller 618 within the second location deployed virtual machine 614 validates the first location deployed virtual machine 608 within the first deployment environment 602.

To perform the mutual real-time virtual machine integrity checks, each of the health care controller 612 and the health care controller 618 maintain clones of the respective other location virtual machines within a secured environment (e.g., a "sandbox") that is protected from access by other systems/locations. Specifically, the health check controller 612 within the first location deployed virtual machine 608 maintains a secured clone 620 of the second location deployed virtual machine 614, while the health check controller 618 within the second location deployed virtual machine 614 maintains a secured clone 622 of the first location deployed virtual machine 608.

The secured clone 620 includes a health check agent 624, while the secured clone 622 includes a health check agent 626. To validate the health of the second location deployed virtual machine 614, the health check controller 612 interacts with the remote health check controller 618 and with local health check agent 624 in its local clone 620 to validate responses received from the remote health check controller 618 regarding the health of the second location deployed virtual machine 614. Similarly, to validate the health of the first location deployed virtual machine 608, the health check controller 618 interacts with the remote health check controller 612 and with local health check agent 626 in its local clone 622 to validate responses received from the remote health check controller 612 regarding the health of the first location deployed virtual machine 608.

Figure 10:
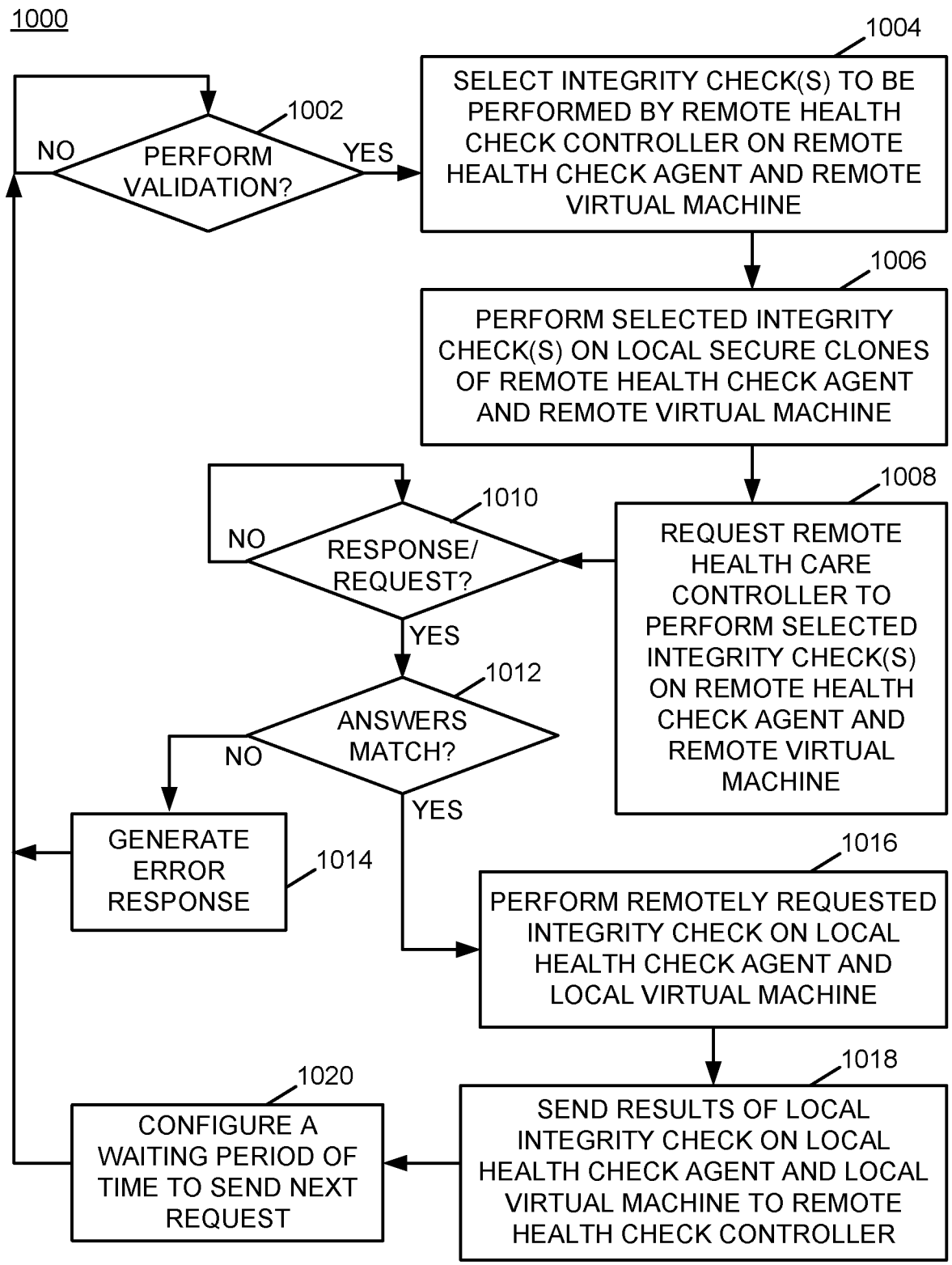
FIG. 10 is a flow chart of an example of an implementation of a process that illustrates additional detailed processing at a health check controller to perform mutual real-time virtual machine integrity checks according to an embodiment of the present subject matter.

FIG. 8 and FIG. 10, described further below, illustrate flowcharts of detailed processing carried out within the example processing environment 600 between the health check controllers 612 and 618, and between the respective health check controllers 612/618 and the respective health check agents 624/626 for the mutual real-time virtual machine integrity checks. Additional description is deferred at this time to begin higher-level flowchart descriptions.

FIG. 7 through FIG. 10 described below represent example processes that may be executed by devices, such as the core processing module 200, to perform the automated virtual machine integrity checks associated with the present subject matter. Many other variations on the example processes are possible and all are considered within the scope of the present subject matter. The example processes may be performed by modules, such as the virtual machine integrity check module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

Figure 7:
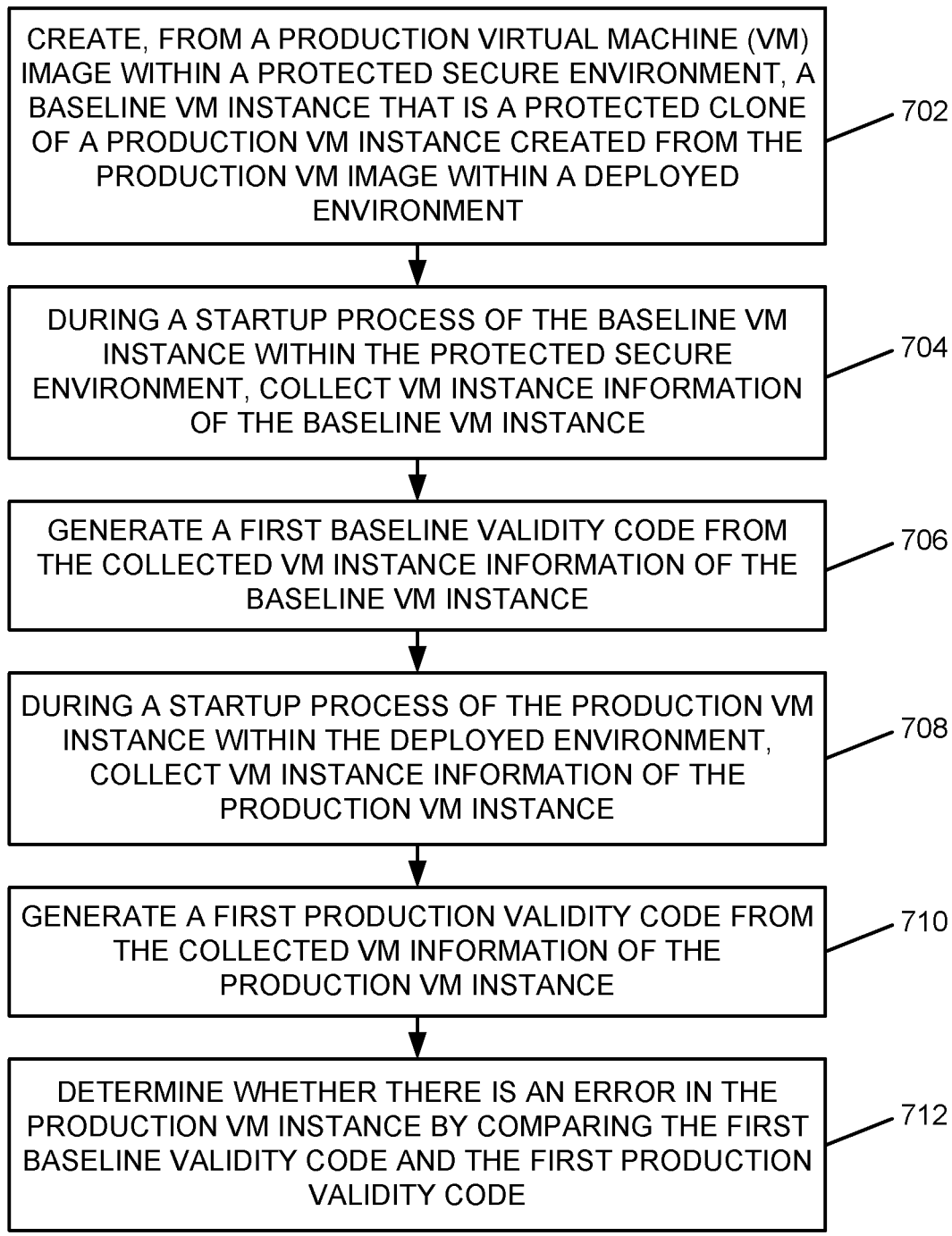
FIG. 7 is a flow chart of an example of an implementation of a process for automated virtual machine integrity checks according to an embodiment of the present subject matter.

FIG. 7 is a flow chart of an example of an implementation of a process 700 for automated virtual machine integrity checks. The process 700 represents a computer-implemented method of performing the automated virtual machine integrity checks described herein. At block 702, the process 700 creates, from a production virtual machine (VM) image within a protected secure environment, a baseline VM instance that is a protected clone of a production VM instance created from the production VM image within a deployed environment. At block 704, the process 700, during a startup process of the baseline VM instance within the protected secure environment, collects VM instance information of the baseline VM instance. At block 706, the process 700 generates a first baseline validity code from the collected VM instance information of the baseline VM instance. At block 708, the process 700, during a startup process of the production VM instance within the deployed environment, collects VM instance information of the production VM instance. At block 710, the process 700 generates a first production validity code from the collected VM information of the production VM instance. At block 712, the process 700 determines whether there is an error in the production VM instance by comparing the first baseline validity code and the first production validity code.

FIG. 8 is a flow chart of an example of an implementation of a process 800 that illustrates additional detailed processing at a health check agent for either individual or mutual real-time virtual machine integrity checks. The process 800 further applies to both production and sandbox virtual machines. The process 800 represents a computer-implemented method of performing the automated virtual machine integrity checks described herein. Further, it should be understood that the process 800 may operate in association with one or more deployed virtual machines, and may as a result be re-entrant or duplicated as appropriate for a given implementation. It is further understood that the process 800 may block the virtual machine from accessing resources of the deployed system until the initial validation operations are completed and the virtual machine is verified to be uncorrupted.

At decision point 802, the process 800 makes a determination as to whether a virtual machine (VM) startup has been detected by an associated health check agent/processor. It should be noted that a virtual machine startup may be detected early, such as while the virtual machine is in its early boot operations to allow the process 800 to detect a compromised virtual machine early in the boot sequence to prevent any such corrupted virtual machine from corrupting the deployed system within which the virtual machine is booting.

In response to determining that a VM startup has been detected at decision point 802, at block 804 the process 800 begins a registration process by scanning one or both of the virtual machine image and the running virtual machine instance to obtain virtual machine information about the virtual machine instance (e.g., number of running processes, process sizes of each running process, and other operational attributes as appropriate for a given implementation). At block 806, the process 800 generates a unique virtual machine identifier (VM-ID) and records virtual machine information from the running virtual machine instance. As described above, the VM-ID is an initial integrity value derived directly from the virtual machine instance by scanning one or more non-transient (not changing) regions of the virtual machine instance, and by performing a selected validity code function on results of the region scan(s). The resulting validity code may be utilized to uniquely represent a current/initial state of any or all non-transient elements of the VM instance, such as the operating system, log files, temp files, etc. The recorded virtual machine information may include the VM-ID and any additional information appropriate for a given implementation, including the number of processes, process sizes, etc.

At block 808, the process 800 stores the virtual machine information and the VM-ID locally, and reports each of the virtual machine information (including the calculated VM-ID) to the health check controller. As described in more detail below with respect to FIG. 9, where the VM-ID and virtual machine information originates from a local clone within sandbox environment, the health check controller recognizes the origin of the registration and stores the VM-ID and virtual machine information as baseline information. Where the VM-ID and virtual machine information originates from the virtual machine within the production environment, the health check controller recognizes the origin of the registration. The health check controller compares the reported production virtual machine information and the VM-ID to the virtual machine information and VM-ID obtained from the protected local clone of the virtual machine instance, as described in more detail in association with the additional drawing figures that follow. The health check controller may determine that the deployed/production virtual machine instance is corrupted and/or compromised (e.g., by hacking, etc.), and may instruct the health check agent to take action to stop or prevent the virtual machine instance from compromising the deployed system within which the deployed virtual machine instance is instantiated.

At decision point 810, the process 800 makes a determination as to whether an error response is received from the health check controller. As such, the process 800 performs an early detection of an error associated with the virtual machine that has just performed a startup in the deployed system to prevent a compromised virtual machine from corrupting the deployed system. An error response may be received for a variety of reasons depending upon the implementation, though several example reasons for receipt of an error response from the health check controller are as follows. For example, an error response may be received if the virtual machine identification information sent to the health check controller does not match the virtual machine identification information of the secured clone of the deployed virtual machine. As an additional example, an error response may be received if the VM-ID sent to the health check controller does not match the VM-ID of the secured clone of the deployed virtual machine. Other error responses are possible, as appropriate for a given implementation.

In response to determining at decision point 810 that an error response has not been received from the health check controller, which indicates that there is a good startup and validation of the virtual machine instance, the process 800 begins iterative processing at decision point 812 to respond to periodic scan processing requests from the health check controller. In response to receiving a scan request from the health check controller, the process 800 performs the requested scan and validity code function on the specified scan location(s) at block 814. At block 816, the process 800 sends the result(s) of the scan and calculated validity code to the health check controller at block 816. The process 800 returns to decision point 810 and iterates as described above to determine whether an error response has been received or to process additional scan requests.

Returning to the description of decision point 810, in response to determining that an error response has been received from the health check controller, the process 800 makes a determination at decision point 818 as to whether the error response instructs quarantine or shutdown of the virtual machine instance. As described above, there may be situations in which a quarantine of the affected/corrupted virtual machine instance may provide additional opportunities for error evaluation.

In response to determining that the error response instructs quarantine of the virtual machine instance, the process 800 blocks virtual machine access to critical resources and quarantines the virtual machine at block 820. Alternatively, in response to determining that the error response instructs shutdown of the virtual machine instance, the process 800 blocks virtual machine access to critical resources and shuts the virtual machine down at block 822. In response to either placing the virtual machine instance into quarantine at block 820 or shutting the virtual machine instance down at block 822, the process 800 returns to decision point 802 and iterates as described above.

As such, the process 800 performs virtual machine startup detection and processing to validate the virtual machine instance that is starting up and to prevent a corrupted virtual machine instance from corrupting the deployed system. The process 800 responds to scan requests, scans and performs the specified validity code function on requested sections of the virtual machine instance, and reports the scan and validity code as results of the validity query to the health check controller. The process 800 may quarantine or shut down a corrupted/un-validated virtual machine instance.

FIG. 9 is a flow chart of an example of an implementation of a process 900 that illustrates additional detailed processing at a health check controller to perform individual real-time virtual machine integrity checks. The process 900 represents a computer-implemented method of performing the automated virtual machine integrity checks described herein. It should be noted that to reduce complexity in the drawing, the process 900 represents a "per-pair" process and is considered re-entrant, such that the processing described is related to each pairing of the health check controller and an associated health check agent. Further, because the health check controller of the individual real-time virtual machine integrity check processing interacts with two distinct health check agents (e.g, the sandbox/secured environment health check agent, and the deployed production environment health check agent), the processing illustrated and described represents processing for each such pairing between the health check controller and the respective health check agents. To further reduce complexity in the drawing and description, it is presumed that the sandbox virtual machine and its associated health check controller are first to be booted and processed, though additional/alternative processing may be provided as appropriate for the given implementation. For example, where the deployed virtual machine and its associated health check agent boot and attempt to register before the respective secured components, the registration attempt of the deployed virtual machine and its associated health check agent may be blocked and/or delayed until the secured virtual machine and its associated health check agent are processed. This processing is considered to be a part of the process 900, and is only omitted from the drawing to avoid crowding in the drawing.

At decision point 902, the process 900 makes a determination as to whether a virtual machine (VM) registration request/attempt has been detected. Again, it is presumed for purposes of the present description that the first registration request is received from the health check agent of the secure virtual machine operating within the sandbox/protected environment. In response to determining that a virtual machine (VM) registration request/attempt has been detected, the process 900 determines the originating system from which the virtual machine registration request was received at block 904. For example, the process 900 may evaluate a virtual machine identifier (VM-ID) and/or health check agent identifier along with an Internet protocol (IP) address from which the registration request was received to determine whether the respective virtual machine is a secured instance of a virtual machine or a deployed instance of a virtual machine. For example, the process 900 may further ensure that the IP address is within an IP address range associated with the secure/protected sandbox environment for the secured instance, or that the IP address is within an IP address range associated with a deployed production environment.

At decision point 906, the process 900 makes a determination as to whether the IP address associated with a registration request originates from the secure protected sandbox environment, or a respective deployed production environment. Again, it should be noted that a first registration request from a virtual machine/health check agent in the deployed production environment may be blocked or delayed at this point in processing to allow the sandbox virtual machine to be registered first. While considered a portion of the process 900, this additional processing is not separately illustrated to reduce crowding in the drawing. Additional processing associated with a negative determination at decision point 906 will be described in more detail further below after description of registration processing for the protected sandbox virtual machine/health check agent. As such, in response to determining that the IP address associated with a registration request originates from the secure protected sandbox environment, at block 908 the process 900 records registration information for the protected virtual machine. As described above, the registration information may include the virtual machine identifier (VM-ID), a number of running processes, process sizes of each running process, and other operational attributes as appropriate for a given implementation.

At block 910, the process 900 generates a random scan and validity code function request as an integrity check. As described above in detail, an integrity check involves specification of a randomly selected validity code function and a random selection of one or more file locations and/or memory ranges to be scanned and to which the randomly selected validity code function is to be applied. As such, the integrity check represents a two-dimensional integrity challenge question. For example, the process 900 may randomly specify an index into a library of validity code functions, and may randomly specify one or more ranges of file and/or memory locations to be scanned and to which the selected validity code function is to be applied. The process 900 may formulate the integrity challenge question into an integrity check query.

At block 912, the process 900 sends the random scan and validity code function request to the protected virtual machine as an integrity check query (integrity challenge). At decision point 914, the process 900 iterates to await a response to the integrity check query.

In response to determining at decision point 914 that a response to the integrity check query has been received, the process 900 stores the received validity code at block 916. At decision point 918, the process 900 makes a determination as to whether the current scan set is completed. For example, the process 900 may build a set of validity codes from the protected virtual machine at startup, and may utilize this set of validity codes to increase the speed and thereby improve efficiency of real-time processing. In response to determining that the current scan set is not completed, the process 900 returns to block 910 and iterates as described above to issue additional validity queries to the protected virtual machine. In response to determining at decision point 918 that the current scan set is completed, the process 900 returns to decision point 902 and iterates as described above to await a registration from a deployed/paired virtual machine instance.

Returning to the description of decision point 906, in response to determining that a virtual machine (VM) registration request/attempt does not originate from the secure protected sandbox environment, the process 900 records the registration information received from the deployed virtual machine (not separately illustrated). The process 900 makes a determination at decision point 920 as to whether the registration information received from the deployed virtual machine matches the registration information previously received from the protected virtual machine (recorded/stored at block 908).

In response to determining at decision point 920 that the registration information received from the deployed virtual machine does not match the registration information recorded for the protected virtual machine, the process 900 generates an error response at block 922. The error response may be issued to the respective deployed health check controller and/or to another system as appropriate for a given implementation. The process 900 blocks registration of the deployed virtual machine, and returns to decision point 902 and iterates as described above.

Alternatively, in response to determining at decision point 920 that the registration information received from the deployed virtual machine matches the registration information recorded for the protected virtual machine (e.g., the deployed virtual machine instance is instantiated as a valid/uncorrupted instance), the process 900 begins random validation processing against each of the sandbox virtual machine and the deployed virtual machine to verify the integrity of the deployed virtual machine and to detect possible corruption of the deployed virtual machine over time. At block 924, the process 900 randomly selects each of a scan pattern and validity code function to be applied to the deployed virtual machine at block 924. As described above, the random scan may specify one or more file and/or memory locations/ranges. The validity code function may be specified by name or other identifier, or may be specified by selection of a library index that identifies the validity code function among a set of validity code functions.

At block 926, the process 900 sends the random scan and validity code function request as an integrity check query to the deployed virtual machine. It should be noted that the process 900 as illustrated and described may specify a full or a partial scan set in advance of the real-time processing for a deployed virtual machine validation to improve performance. Additionally, even where such a full or partial scan set is prepared in advance, such a set may be augmented over time and/or an integrity challenge may be issued to each of the protected and the deployed virtual machine instances in parallel in real time. As such, the processing at block 926 may additionally/alternatively send the integrity check query to the protected virtual machine instance in parallel with sending the integrity check query to the deployed virtual machine instance.

At decision point 928, the process 900 iterates to await a response to the integrity check query (or queries as appropriate for a given implementation). In response to determining at decision point 928 that a response (or both responses) to the integrity check query has (have) been received, the process 900 makes a determination at decision point 930 as to whether the respective answers received from the protected virtual machine (stored at block 916) and received from the deployed virtual machine match. In response to determining that the answers received from the protected virtual machine and the deployed virtual machine match, at block 932 the process 900 validates the deployed virtual machine and waits a configured period of time to send a next integrity check query. The configured period of time may be randomly selected, or may be specified with periodicity or otherwise as appropriate for a given implementation.

After the configured period of time has elapsed, the process 900 returns to block 924 to select a new scan pattern and validity code function to be applied to the deployed virtual machine. The process 900 iterates as described above to periodically issue integrity queries and validate the deployed virtual machine instance.

Returning to the description of decision point 930, in response determining that the respective answers received from the protected virtual machine and the deployed virtual machine do not match, the process 900 returns to block 922 and generates an error response as described above. As described above, the respective health check agent may quarantine or stop execution of the deployed virtual machine from which an incorrect validity code is received. The process 900 returns to decision point 902 and iterates as described above.

As such, the process 900 iterates to process registration requests for protected and deployed virtual machine instances, and iterates to select and formulate random integrity queries to the respective virtual machine instances. The process 900 may detect corruption of deployed virtual machines by use of the techniques described, and a corrupted virtual machine may be prevented from corrupting the respective system within which it is deployed by being quarantined or by having its execution on the respective platform stopped.

FIG. 10 is a flow chart of an example of an implementation of a process 1000 that illustrates additional detailed processing at a health check controller to perform mutual real-time virtual machine integrity checks. The process 1000 represents a computer-implemented method of performing the automated virtual machine integrity checks described herein. It should be noted that the process 1000 may be performed by each paired set of health check controllers associated within a mutual real-time virtual machine integrity check set of deployments.

At decision point 1002, the process 1000 makes a determination as to whether to perform a mutual validation (a mutual integrity check). In response to determining to perform a mutual validation, the process 1000 selects one or more integrity checks to be performed by the remote health check controller to validate the remote virtual machine (that includes the remote health check agent) at block 1004. It should be noted that one integrity check may be applied to the health check controller and its associated virtual machine together, or separate integrity checks may be applied to the respective components as appropriate for a given implementation. As described above in detail, an integrity check involves specification of a randomly selected validity code function and a random selection of one or more file locations and/or memory ranges to be scanned and to which the randomly selected validity code function is to be applied. As such, the integrity check represents a two-dimensional challenge question.

At block 1006, the process 1000 performs the selected integrity check(s) on the local secure clone of the remote health check agent and on the local secure clone of the remote virtual machine instance. Performing the selected integrity check(s) results in one or more validity codes, as configured by the selected integrity check(s).

At block 1008, the process 1000 requests the remote health care controller to perform the selected integrity check(s) on the remote health check agent and on the remote virtual machine instance. It should be noted that the process 1000 does not send the local validity code(s) prior to requesting the remote validation process to avoid a corrupted remote platform from just sending the validity code(s) back without doing any validation processing on the remote components.

At decision point 1010, the process 1000 makes a determination as to whether responses to the requested remote integrity check(s) and the requested local integrity check have been received. It should be noted that the responses and requests may be received and sent separately, and are combined in the present description for ease of description.

As such, in response to determining that responses to the requested remote integrity check(s) and the requested local integrity check have been received at decision point 1010, the process 1000 makes a determination at decision point 1012 as to whether the locally-calculated validity code(s) match the validity code(s) calculated and returned from the remote system. In response to determining that the validity code(s) do not match, the process 1000 generates an error response at block 1014. As with the other error responses described above, the error response may be generated to the remote health check controller and/or to a separate system as appropriate for a given implementation. In response to generating the error response at block 1014, the process 1000 returns to decision point 1002 and iterates as described above.

Returning to the description of decision point 1012, in response to determining that the locally-calculated validity code(s) match the validity code(s) calculated and returned from the remote system, the process 1000 performs a (remotely) requested integrity check received from the remote health check controller on the local health check agent and the local virtual machine at block 1016. The process 1000 sends the results of the local integrity check on the local health check agent and the local virtual machine to the remote health check controller at block 1018.

The process 1000 configures a waiting period of time to send the next integrity check request to the remote health check controller at block 1020. The configured period of time may be randomly selected, or may be specified with periodicity or otherwise as appropriate for a given implementation. The process 1000 returns to decision point 1002 and iterates as described above.

As such, the process 1000 performs mutual real-time virtual machine integrity checks among two or more deployed virtual machines. The process 1000 performs local integrity checks on a local clone of a remote virtual machine and remote health check agent, and validates the remote components according to proper responses received from the remote health check controller. The process 1000 also responds to local integrity check requests and performs the requested integrity checks on the local deployed virtual machine. As described above, this processing may be scaled to multiple horizontal installations to provide multi-redundant scaled mutual real-time virtual machine integrity checks among multiple deployed virtual machines.

Some embodiments of the present invention may improve the technology of computers in one, or more, of the following ways: (i) detection of corruption of deployed virtual machine instances may be improved by providing real-time operational validity checks of deployed virtual machines that require the deployed virtual machine to respond in a manner that is predictable by comparison with results derived from the local clone and for which incorrect operational responses may thereby be rapidly detected; (ii) real-time detection of system intrusions into virtual machine instances may be improved by providing the real-time validity checks in a random/unpredictable manner to prevent hackers from predicting what type of validity check will be issued; and (iii) a rate of detection of corrupted deployed virtual machine images may be improved/increased by providing the individual and mutual real-time validity checks using real-time questions to and responses from virtual machines that are proved accurate during runtime by use of a sandbox instance/clone of a deployed virtual machine instance. Additional technological advances provided by the subject matter described herein are detailed above.

The present invention is not abstract because it relates particularly to computer operations and/or hardware for reasons that may include the following: (i) detection of corruption of deployed virtual machine instances is provided through real-time in-system interrogation of the deployed virtual machine instances; (ii) operational verification of virtual machine instances is provided in real time from system(s) other than a system within which the virtual machine instance is deployed; and (iii) validation computing system(s) are provided that may prevent a compromised/corrupted deployed virtual machine instance from continuing to operate, with an alternative to quarantine that deployed virtual machine instance to improve the real-time detection capabilities of the computing technology itself.

As described above in association with FIG. 1 through FIG. 10, the example systems and processes provide automated virtual machine integrity checks. Many other variations and additional activities associated with automated virtual machine integrity checks are possible and all are considered within the scope of the present subject matter.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A computer-implemented method, comprising:
    creating, from a production virtual machine (VM) image within a protected secure environment, a baseline VM instance that is a protected clone of a production VM instance created from the production VM image within a deployed environment;
    during a startup process of the baseline VM instance within the protected secure environment, collecting VM instance information of the baseline VM instance;
    generating a first baseline validity code from the collected VM instance information of the baseline VM instance;
    during a startup process of the production VM instance within the deployed environment, collecting VM instance information of the production VM instance;
    generating a first production validity code from the collected VM information of the production VM instance;
    determining whether there is a first error in the production VM instance by comparing the first baseline validity code and the first production validity code;
    at a regular interval, performing a first scan of random memory locations and files of the production VM instance;
    generating a second production validity code from results of the first scan;

at the regular interval, performing a second scan of the same random memory locations and files scanned in the production VM instance, but of the baseline VM instance;
generating a second baseline validity code from results of the second scan; and
determining whether there is a second error in the production VM instance by comparing the second production validity code and the second baseline validity code.

2. The computer-implemented method of claim 1, further comprising one of stopping execution of the production VM instance or quarantining the production VM instance responsive to determining either that there is the first error in the production VM instance or that there is the second error in the production VM instance.

3. The computer-implemented method of claim 1, where:
collecting the VM instance information of the baseline VM instance comprises collecting a number of processes and process sizes of each of the number of processes of the baseline VM instance; and
collecting the VM instance information of the production VM instance comprises collecting a number of processes and process sizes of each of the number of processes of the production VM instance.

4. The computer-implemented method of claim 1, where:
the production VM image comprises a health check agent that, once instantiated as a part of each of the baseline VM instance and the production VM instance, operates within the respective baseline VM instance and the production VM instance to respond to real-time virtual machine validity queries;
generating the first baseline validity code from the collected VM instance information of the baseline VM instance comprises issuing, from a health check controller that operates independently of the baseline VM instance, a randomly-selected real-time virtual machine validity query to the health check agent of the baseline VM instance and receiving the first baseline validity code from the health check agent of the baseline VM instance; and
generating the first production validity code from the collected VM instance information of the production VM instance comprises issuing, from the health check controller that operates independently of the production VM instance, the randomly-selected real-time virtual machine validity query to the health check agent of the production VM instance and receiving the first production validity code from the health check agent of the production VM instance.

5. The computer-implemented method of claim 1, further comprising:
managing, by a local health check controller within a local deployment environment, a local third deployed VM instance created from a second production VM image;
receiving, from a remote health check controller, a real-time virtual machine validity query that specifies (i) at least one of an operational file area and an operational memory area of the local third deployed VM instance to be scanned in real-time to obtain operational integrity data values of the local third deployed VM instance, and that specifies (ii) a selected validity code function to be applied to the obtained data values scanned from the at least one of the operational file area and the operational memory area of the local third deployed VM instance;
performing the specified real-time scan and applying the selected validity code function to the obtained data values to derive a real-time validity code from the local third deployed VM instance; and
responding to the real-time virtual machine validity query with the real-time validity code derived from the local third deployed VM instance.

6. The computer-implemented method of claim 1, where software is provided as an automated virtual machine integrity check service in a cloud environment.

7. A system, comprising:
a memory; and
a processor programmed to:
create, from a production virtual machine (VM) image within a protected secure environment of the memory, a baseline VM instance that is a protected clone of a production VM instance created from the production VM image within a deployed environment;
during a startup process of the baseline VM instance within the protected secure environment, collect VM instance information of the baseline VM instance;
generate a first baseline validity code from the collected VM instance information of the baseline VM instance;
during a startup process of the production VM instance within the deployed environment, collect VM instance information of the production VM instance;
generate a first production validity code from the collected VM information of the production VM instance;
determine whether there is a first error in the production VM instance by comparing the first baseline validity code and the first production validity code;
at a regular interval, perform a first scan of random memory locations and files of the production VM instance;
generate a second production validity code from results of the first scan;
at the regular interval, perform a second scan of the same random memory locations and files scanned in the production VM instance, but of the baseline VM instance;
generate a second baseline validity code from results of the second scan; and
determine whether there is a second error in the production VM instance by comparing the second production validity code and the second baseline validity code.

8. The system of claim 7, where the processor is further programmed to:
one of stop execution of the production VM instance or quarantine the production VM instance responsive to determining either that there is the first error in the production VM instance or that there is the second error in the production VM instance.

9. The system of claim 7, where:
in being programmed to collect the VM instance information of the baseline VM instance, the processor is programmed to collect a number of processes and process sizes of each of the number of processes of the baseline VM instance; and
in being programmed to collect the VM instance information of the production VM instance, the processor is programmed to collect a number of processes and process sizes of each of the number of processes of the production VM instance.

10. The system of claim 7, where:
the production VM image comprises a health check agent that, once instantiated as a part of each of the baseline VM instance and the production VM instance, operates within the respective baseline VM instance and the production VM instance to respond to real-time virtual machine validity queries;
in being programmed to generate the first baseline validity code from the collected VM instance information of the baseline VM instance, the processor is programmed to issue, from a health check controller that operates independently of the baseline VM instance, a randomly-selected real-time virtual machine validity query to the health check agent of the baseline VM instance and receive the first baseline validity code from the health check agent of the baseline VM instance; and
in being programmed to generate the first production validity code from the collected VM instance information of the production VM instance, the processor is programmed to issue, from the health check controller that operates independently of the production VM instance, the randomly-selected real-time virtual machine validity query to the health check agent of the production VM instance and receive the first production validity code from the health check agent of the production VM instance.

11. The system of claim 7, where the processor is further programmed to:
manage, by a local health check controller within a local deployment environment, a local third deployed VM instance created from a second production VM image;
receive, from a remote health check controller, a real-time virtual machine validity query that specifies (i) at least one of an operational file area and an operational memory area of the local third deployed VM instance to be scanned in real-time to obtain operational integrity data values of the local third deployed VM instance, and that specifies (ii) a selected validity code function to be applied to the obtained data values scanned from the at least one of the operational file area and the operational memory area of the local third deployed VM instance;
perform the specified real-time scan and apply the selected validity code function to the obtained data values to derive a real-time validity code from the local third deployed VM instance; and
respond to the real-time virtual machine validity query with the real-time validity code derived from the local third deployed VM instance.

12. The system of claim 7, where software is provided as an automated virtual machine integrity check service in a cloud environment.

13. A computer program product, comprising:
a computer readable storage medium having computer readable program code embodied therewith, where the computer readable storage medium is not a transitory signal per se and where the computer readable program code when executed on a computer causes the computer to:
create, from a production virtual machine (VM) image within a protected secure environment, a baseline VM instance that is a protected clone of a production VM instance created from the production VM image within a deployed environment;
during a startup process of the baseline VM instance within the protected secure environment, collect VM instance information of the baseline VM instance;
generate a first baseline validity code from the collected VM instance information of the baseline VM instance;
during a startup process of the production VM instance within the deployed environment, collect VM instance information of the production VM instance;
generate a first production validity code from the collected VM information of the production VM instance;
determine whether there is a first error in the production VM instance by comparing the first baseline validity code and the first production validity code; and
at a regular interval, perform a first scan of random memory locations and files of the production VM instance;
generate a second production validity code from results of the first scan;
at the regular interval, perform a second scan of the same random memory locations and files scanned in the production VM instance, but of the baseline VM instance;
generate a second baseline validity code from results of the second scan; and
determine whether there is a second error in the production VM instance by comparing the second production validity code and the second baseline validity code.

14. The computer program product of claim 13, where the computer readable program code when executed on the computer further causes the computer to one of stop execution of the production VM instance or quarantine the production VM instance responsive to determining either that there is the first error in the production VM instance or that there is the second error in the production VM instance.

15. The computer program product of claim 13, where:
in causing the computer to collect the VM instance information of the baseline VM instance, the computer readable program code when executed on the computer causes the computer to collect a number of processes and process sizes of each of the number of processes of the baseline VM instance; and
in causing the computer to collect the VM instance information of the production VM instance, the computer readable program code when executed on the computer causes the computer to collect a number of processes and process sizes of each of the number of processes of the production VM instance.

16. The computer program product of claim 13, where:
the production VM image comprises a health check agent that, once instantiated as a part of each of the baseline VM instance and the production VM instance, operates within the respective baseline VM instance and the production VM instance to respond to real-time virtual machine validity queries;
in causing the computer to generate the first baseline validity code from the collected VM instance information of the baseline VM instance, the computer readable program code when executed on the computer causes the computer to issue, from a health check controller that operates independently of the baseline VM instance, a randomly-selected real-time virtual machine validity query to the health check agent of the baseline VM instance and receive the first baseline validity code from the health check agent of the baseline VM instance; and in causing the computer to generate the first production validity code from the collected VM instance information of the production VM instance, the computer readable program code when executed on the computer causes the computer to issue, from the health check controller that operates independently of the production VM instance, the randomly-selected real-time virtual machine validity query to the health check agent of the production VM instance and receive the first production validity code from the health check agent of the production VM instance.

17. The computer program product of claim 13, where the computer readable program code when executed on the computer further causes the computer to:
   manage, by a local health check controller within a local deployment environment, a local third deployed VM instance created from a second production VM image;
   receive, from a remote health check controller, a real-time virtual machine validity query that specifies (i) at least one of an operational file area and an operational memory area of the local third deployed VM instance to be scanned in real-time to obtain operational integrity data values of the local third deployed VM instance, and that specifies (ii) a selected validity code function to be applied to the obtained data values scanned from the at least one of the operational file area and the operational memory area of the local third deployed VM instance;
   perform the specified real-time scan and apply the selected validity code function to the obtained data values to derive a real-time validity code from the local third deployed VM instance; and
   respond to the real-time virtual machine validity query with the real-time validity code derived from the local third deployed VM instance.

18. The computer program product of claim 13, where software is provided as an automated virtual machine integrity check service in a cloud environment.

* * * * *